United States Patent
Aumentado-Armstrong et al.

(10) Patent No.: US 12,217,351 B2
(45) Date of Patent: Feb. 4, 2025

(54) REPRESENTING 3D SHAPES WITH PROBABILISTIC DIRECTED DISTANCE FIELDS

(71) Applicant: SAMSUNG ELECTRONICS CO., LTD., Suwon-si (KR)

(72) Inventors: Tristan Ty Aumentado-Armstrong, Toronto (CA); Stavros Tsogkas, Toronto (CA); Sven Josef Dickinson, Toronto (CA); Allan Jepson, Oakville (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 178 days.

(21) Appl. No.: 17/984,521

(22) Filed: Nov. 10, 2022

(65) Prior Publication Data
US 2023/0154102 A1 May 18, 2023

Related U.S. Application Data

(60) Provisional application No. 63/280,010, filed on Nov. 16, 2021.

(51) Int. Cl.
*G06T 15/06* (2011.01)
*G06T 15/10* (2011.01)

(52) U.S. Cl.
CPC .............. *G06T 15/06* (2013.01); *G06T 15/10* (2013.01)

(58) Field of Classification Search
CPC ................................ G06T 15/06; G06T 15/10
See application file for complete search history.

(56) References Cited

U.S. PATENT DOCUMENTS

| 8,659,593 B2 | 2/2014 | Furukawa et al. |
| 10,902,679 B2 | 1/2021 | Molyneaux et al. |

(Continued)

FOREIGN PATENT DOCUMENTS

KR   10-2019-0112894 A   10/2019

OTHER PUBLICATIONS

Yue Jiang et al., "SDFDiff: Differentiable Rendering of Signed Distance Fields for 3D Shape Optimization", arXiv:1912.07109v1 [cs.CV], Dec. 15, 2019, 10 pages.

(Continued)

*Primary Examiner* — Kee M Tung
*Assistant Examiner* — Jed-Justin Imperial
(74) *Attorney, Agent, or Firm* — Sughrue Mion, PLLC

(57) ABSTRACT

The present disclosure provides methods, apparatuses, and computer-readable mediums for representing shapes with probabilistic directed distance fields. In some embodiments, a method includes obtaining a camera representation and a latent shape vector representation of a scene. The camera representation indicates position information and direction information of a view of the scene. The method further includes calculating, based on the latent shape vector representation of the scene, a visibility score and a depth for each ray of a plurality of rays emanating from a corresponding plurality of positions and directions. The plurality of positions and directions are determined from the camera representation of the scene. The method further includes generating renders of geometric information of the scene using the visibility score and the depth of the plurality of rays.

20 Claims, 11 Drawing Sheets

(56) References Cited

U.S. PATENT DOCUMENTS

| | | | |
|---|---|---|---|
| 10,950,036 | B2 | 3/2021 | Ha et al. |
| 11,010,961 | B2 | 5/2021 | Stachniak et al. |
| 11,315,319 | B2 | 4/2022 | Yu et al. |
| 2015/0332505 | A1* | 11/2015 | Wang .................... G06T 19/006 345/633 |
| 2019/0197765 | A1* | 6/2019 | Molyneaux .......... G02B 27/017 |
| 2019/0286231 | A1 | 9/2019 | Burns et al. |
| 2021/0090322 | A1 | 3/2021 | Hunt |
| 2022/0130127 | A1 | 4/2022 | Zhang et al. |

OTHER PUBLICATIONS

Julian Chibane et al., "Neural Unsigned Distance Fields for Implicit Function Learning", arXiv:2010.13938v1 [cs.CV], Oct. 26, 2020, 15 pages.

Tristan Aumentado-Armstrong et al., "Cycle-Consistent Generative Rendering for 2D-3D Modality Translation", arXiv:2011.08026v1 [cs.CV], Nov. 16, 2020, 22 pages.

Tristan Aumentado-Armstrong et al., "Representing 3D Shapes with Probabilistic Directed Distance Fields", arXiv:2112.05300v1 [cs.CV], Dec. 10, 2021, 22 pages.

International Search Report and Written Opinion (PCT/ISA/220,PCT/ISA/210, and PCT/ISA/237) issued by the International Searching Authority on Feb. 23, 2023 in corresponding International Application No. PCT/KR2022/017969.

Communication issued Oct. 24, 2024 by the European Patent Office in European Patent Application No. 22896014.2.

Sitzmann, Vincent et al., "Light Field Networks: Neural Scene Representations with Single-Evaluation Rendering", arXiv:2106.02634v1 [cs.CV], Jun. 4, 2021, XP081984210. (10 pages total).

Aumentado-Armstrong, Tristan et al., "Representing 3D Shapes with Probabilistic Directed Distance Fields", arXiv:2112.05300v1 [cs.CV], Dec. 10, 2021, XP093067478. (22 pages total).

Sitzmann, Vincent et al., "Scene Representation Networks: Continuous 3D-Structure-Aware Neural Scene Representations", arXiv: 1906.01618v2 [cs.CV], Jan. 28, 2020, XP081587552. (23 pages total).

Lin, Chieh Hubert et al., "COCO-GAN: Generation by Parts via Conditional Coordinating", arXiv:1904.00284v4 [cs.LG], Jan. 5, 2020, XP081571766. (25 pages total).

* cited by examiner (A) DEPTH IMAGE RENDERS (B) NORMAL IMAGE RENDERS (C) CURVATURE IMAGE RENDERS

FIG. 10A   FIG. 10B

REPRESENTING 3D SHAPES WITH PROBABILISTIC DIRECTED DISTANCE FIELDS

CROSS-REFERENCE TO RELATED APPLICATIONS

This application claims benefit of priority under 35 U.S.C. § 119 to U.S. Provisional Patent Application No. 63/280,010, filed on Nov. 16, 2021, in the U.S. Patent and Trademark Office, the disclosure of which is incorporated by reference herein in its entirety.

BACKGROUND

1. Field

The present disclosure relates generally to differentiable rendering, and more particularly to methods and apparatuses for representing three-dimensional (3D) shapes with probabilistic directed distance fields (PDDFs).

2. Description of Related Art

Three-dimensional (3D) shapes may be represented in a variety of ways in related computer vision and/or machine learning systems. Differentiable rendering may be an important operation in related computer-based vision applications, which may allow for inverse graphics approaches to infer 3D factors (e.g., shape, pose, texture, lighting) that result in the 2D images captured by the related systems. Explicit and/or implicit shape representations may be used in conjunction with the differentiable rendering methodologies utilized by the related systems.

However, these shape representations may not be suited for some applications. For example, explicit shape representations (e.g., voxels, point clouds, meshes) while relatively easy to render, may only provide limited geometric fidelity and/or may be bound by topological constraints. For another example, implicit representations (e.g., occupancy, distance, or radiance fields) may preserve greater fidelity when generally compared to explicit shape representations, but may require implementation with complex and/or inefficient rendering processes, which may limit scalability.

As a result, choosing an optimal shape representation for a particular task may not be a trivial matter. For example, voxels and point clouds tend to have reduced geometric fidelity, while meshes may exhibit difficulties inherent in discrete structure generation, which may lead to topological and/or textural fidelity constraints, and/or dependence of rendering efficiency on shape complexity. For another example, implicit shapes may have superior fidelity, but may require complex and/or inefficient rendering procedures, such as, but not limited to, multiple network forward passes and/or complex calculations per pixel. Thus, such shape representations may be difficult to use for certain tasks (e.g., deformation, segmentation, correspondence).

Thus, there exists a need for further improvements to representing 3D shapes using differentiable rendering. Improvements are presented herein. These improvements may also be applicable to other multi-dimensional rendering technologies and/or other shape representation technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for representing shapes with probabilistic directed distance fields are disclosed by the present disclosure.

According to an aspect of the present disclosure, a method of representing shapes with probabilistic directed distance fields to be performed by a processor is provided. The method includes obtaining a camera representation and a latent shape vector representation of a scene. The camera representation indicates position information and direction information of a view of the scene. The method further includes calculating, based on the latent shape vector representation of the scene, a visibility score and a depth for each ray of a plurality of rays emanating from a corresponding plurality of positions and directions. The plurality of positions and directions are determined from the camera representation of the scene. The method further includes generating renders of geometric information of the scene using the visibility score and the depth of the plurality of rays.

In some embodiments, the method may further include receiving a plurality of queries requesting the visibility score and the depth for each ray of the plurality of rays emanating from the corresponding plurality of positions and directions. The calculating of the visibility score and the depth of the plurality of rays may include calculating, in response to the receiving of a query of the plurality of queries, the visibility score and the depth of a ray of the plurality of rays corresponding to the corresponding position and direction indicated by the query.

In some embodiments, the method may further include correcting depth information of the renders of the geometric information of the scene across at least one occlusion boundary, based on a switching mechanism over a set of estimated depth values.

In some embodiments, the obtaining of the camera representation and the latent shape vector representation of the scene may include encoding, using a neural encoder, an image comprising the scene.

In some embodiments, the calculating of the visibility score and the depth of the plurality of rays may include combining a plurality of shape representations of the scene, and calculating the visibility score and the depth for each ray of the plurality of rays based on a combination of the plurality of shape representations of the scene.

In some embodiments, the calculating of the visibility score and the depth of the plurality of rays may include performing, for each ray of the plurality of rays, a single forward pass of a conditional coordinate neural network to calculate the visibility score and the depth of that ray.

In some embodiments, the calculating of the visibility score and the depth of the plurality of rays may include calculating a lowest distance for each ray of the plurality of rays intersecting the scene.

In some embodiments, the visibility score may indicate whether a corresponding ray intersects the scene, and the depth may indicate a distance from the corresponding position of the corresponding ray to a nearest intersection point of the corresponding ray with the scene.

In some embodiments, the method may further include calculating, based on the latent shape vector representation of the scene, a reflectance value for each ray of the plurality of rays emanating from the corresponding plurality of positions and directions.

According to an aspect of the present disclosure, an apparatus for representing shapes with probabilistic directed distance fields to be performed by a device is provided. The apparatus includes a memory storage storing computer-executable instructions, and a processor communicatively coupled to the memory storage. The processor is configured to execute the computer-executable instructions and cause the apparatus to obtain a camera representation and a latent shape vector representation of a scene. The camera representation indicates position information and direction information of a view of the scene. The computer-executable instructions further causes the apparatus to calculate, based on the latent shape vector representation of the scene, a visibility score and a depth for each ray of a plurality of rays emanating from a corresponding plurality of positions and directions. The plurality of positions and directions being determined from the camera representation of the scene. The computer-executable instructions further causes the apparatus to generate renders of geometric information of the scene using the visibility score and the depth of the plurality of rays.

In some embodiments, the processor may be further configured to execute further computer-executable instructions and may further cause the apparatus to receive a plurality of queries requesting the visibility score and the depth for each ray of the plurality of rays emanating from the corresponding plurality of positions and directions, and calculate, in response to the receiving of a query of the plurality of queries, the visibility score and the depth of a ray of the plurality of rays corresponding to the corresponding position and direction indicated by the query.

In some embodiments, the processor may be further configured to execute further computer-executable instructions and may further cause the apparatus to correct depth information of the renders of the geometric information of the scene across at least one occlusion boundary, based on a switching mechanism over a set of estimated depth values.

In some embodiments, the processor may be further configured to execute further computer-executable instructions and may further cause the apparatus to encode, using a neural encoder, an image comprising the scene.

In some embodiments, the processor may be further configured to execute further computer-executable instructions and may further cause the apparatus to combine a plurality of shape representations of the scene, and calculate the visibility score and the depth for each ray of the plurality of rays based on a combination of the plurality of shape representations of the scene.

In some embodiments, the processor may be further configured to execute further computer-executable instructions and may further cause the apparatus to perform, for each ray of the plurality of rays, a single forward pass of a conditional coordinate neural network to calculate the visibility score and the depth of that ray.

In some embodiments, the processor may be further configured to execute further computer-executable instructions and may further cause the apparatus to calculate a lowest distance for each ray of the plurality of rays intersecting the scene.

In some embodiments, the visibility score may indicate whether a corresponding ray intersects the scene, and the depth may indicate a distance from the corresponding position of the corresponding ray to a nearest intersection point of the corresponding ray with the scene.

In some embodiments, the processor may be further configured to execute further computer-executable instructions and may further cause the apparatus to calculate, based on the latent shape vector representation of the scene, a reflectance value for each ray of the plurality of rays emanating from the corresponding plurality of positions and directions.

According to an aspect of the present disclosure, a non-transitory computer-readable storage medium storing computer-executable instructions for representing shapes with probabilistic directed distance fields by a device is provided. The computer-executable instructions are configured, when executed by one or more processors of the device, to cause the device to obtain a camera representation and a latent shape vector representation of a scene. The camera representation indicates position information and direction information of a view of the scene. The computer-executable instructions are further configured to further cause the device to calculate, based on the latent shape vector representation of the scene, a visibility score and a depth for each ray of a plurality of rays emanating from a corresponding plurality of positions and directions. The plurality of positions and directions are determined from the camera representation of the scene. The computer-executable instructions are further configured to further cause the device to generate renders of geometric information of the scene using the visibility score and the depth of the plurality of rays.

In some embodiments, the computer-executable instructions may be further configured to further cause the device to receive a plurality of queries requesting the visibility score and the depth for each ray of the plurality of rays emanating from the corresponding plurality of positions and directions, and calculate, in response to the receiving of a query of the plurality of queries, the visibility score and the depth of a ray of the plurality of rays corresponding to the corresponding position and direction indicated by the query.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 10A, 10B, and 10C depict examples of shape discontinuities, in accordance with various aspects of the present disclosure;

DETAILED DESCRIPTION

Figure 1:
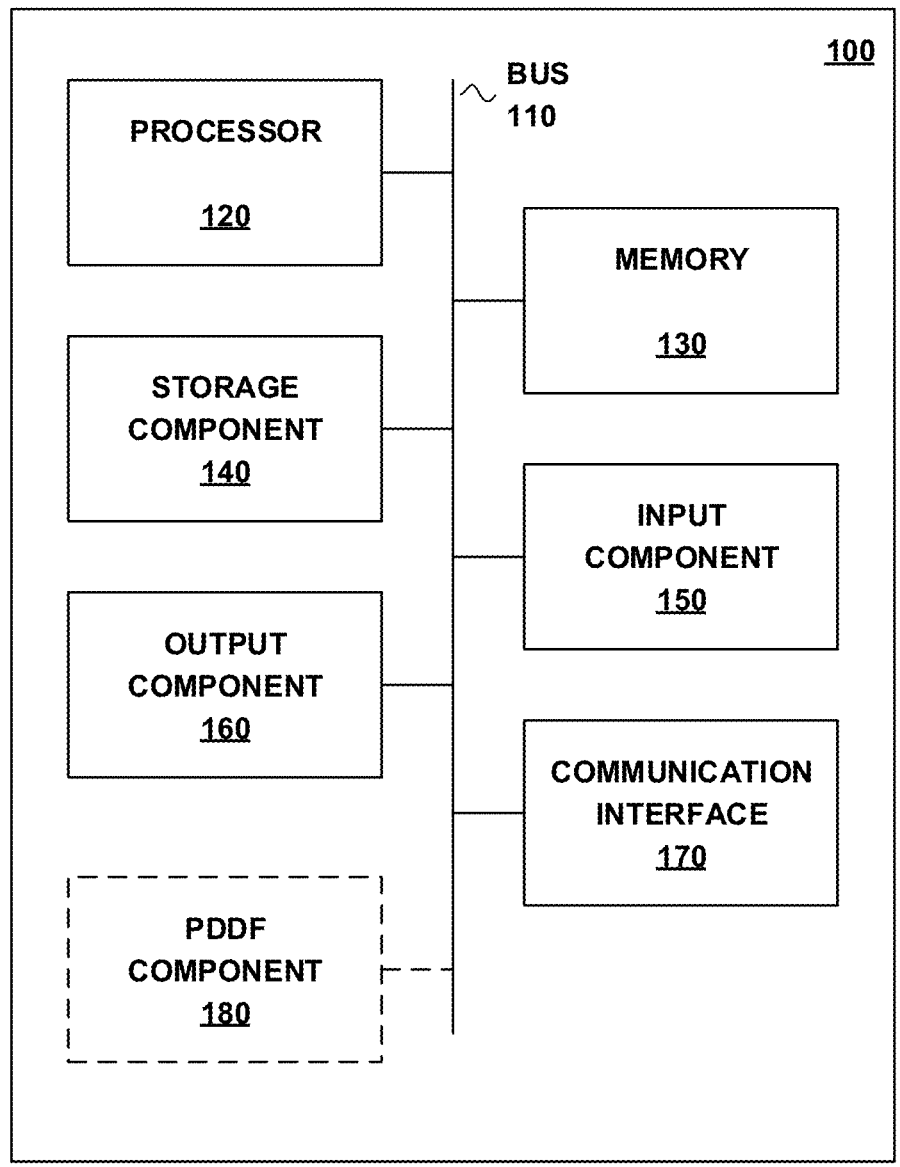
FIG. 1 depicts an example of a device that may be used in implementing one or more aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. In the descriptions that follow, like parts are marked throughout the specification and drawings with the same numerals, respectively.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

As a general introduction to the subject matter described in more detail below, aspects described herein are directed towards systems, devices, and methods for representing three-dimensional (3D) shapes with probabilistic directed distance fields (PDDFs). Aspects described herein may be used to provide PDDFs that may map an oriented point (e.g., having a position and a direction) to a surface visibility and depth to the 3D shape. In some aspects, the PDDFs may allow for designing of shape representations capable of fast, differentiable, and directed geometric queries. Such shape representations may provide a complete, composable, and continuous reproduction of an underlying geometry of a scene. Alternatively or additionally, the shape representations may be obtained from various data types, including, but not limited to, two-dimensional (2D) images and/or other modalities of the 3D shape.

In aspects described herein, for representing shapes with PDDFs, a processor may obtain a camera representation and a latent shape vector representation of a scene. The camera representation may indicate position information and direction information of a view of the scene. In other aspects described herein, the processor may calculate, based on the latent shape vector representation of the scene, a visibility score and a depth for each ray of a plurality of rays emanating from a corresponding plurality of positions and directions. The plurality of positions and directions may be determined from the camera representation of the scene. In other aspects described herein, the processor may generate renders of geometric information of the scene using the visibility score and the depth of the plurality of rays.

The aspects described herein provide advantages over related shape representations by providing shape representations capable of fast, differentiable, and directed geometric queries. Such shape representations may provide a complete, composable, and continuous reproduction of an underlying geometry of a scene. Alternatively or additionally, the shape representations may be obtained from various data types, including, but not limited to, two-dimensional (2D) images and/or other modalities of the 3D shape.

As noted above, certain embodiments are discussed herein that relate to representing shapes. Before discussing these concepts in further detail, however, an example of a computing device that may be used in implementing and/or otherwise providing various aspects of the present disclosure will first be discussed with respect to FIG. 1.

FIG. 1 depicts an example of a device 100 that may be used in implementing one or more aspects of the present disclosure in accordance with one or more illustrative aspects discussed herein. For example, device 100 may, in some instances, implement one or more aspects of the present disclosure by reading and/or executing instructions and performing one or more actions accordingly. In one or more arrangements, device 100 may represent, be incorporated into, and/or comprise a desktop computer, a computer server, a mobile device (e.g., a laptop computer, a tablet computer, a smart phone, any other type of mobile computing device, etc.), and/or any other type of data processing device.

For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device.

In some embodiments, as shown in FIG. 1, the device 100 may comprise a set of components, such as a processor 120, a memory 130, a storage component 140, an input component 150, an output component 160, a communication interface 170, and a PDDF component 180. The set of components of the device 100 may be communicatively coupled via a bus 110.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The present disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a neural processing unit (NPU), an AI-dedicated processor designed to have a hardware structure specified to process an AI model, a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, the communication interface 170, the PDDF component 180).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may comprise a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may comprise one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may comprise a sensor for sensing information (e.g., a global positioning system (GPS) component, an accelerometer, a gyroscope, an actuator, and the like).

The output component 160 of device 100 may comprise one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may comprise a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as, FlashLinQ, WiMedia, Bluetooth, ZigBee, Wi-Fi, LTE, 5G, and the like. In other embodiments, the communication interface 170 may comprise an Ethernet interface, an optical interface, a coaxial interface, an infrared interface, a radio frequency (RF) interface, or the like.

In some embodiments, the device 100 may comprise the PDDF 180 configured to represent shapes with PDDFs. The PDDF component 180 may be configured to obtain a camera representation and a latent shape vector representation of a scene, calculate a visibility score and a depth for each ray of a plurality of rays emanating from a corresponding plurality of positions and directions, and generate renders of geometric information of the scene using the visibility score and the depth of the plurality of rays.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may comprise memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more functions described as being performed by another set of components shown in FIG. 1.

Having discussed an example of a device that may be used in providing and/or implementing various aspects of the present disclosure, a number of embodiments are now discussed in further detail. In particular, and as introduced above, some aspects of the present disclosure generally relate to representing shapes with probabilistic directed distance fields.

Aspects described herein may be used to provide PDDFs that allow for designing of shape representations capable of fast, differentiable, and directed geometric queries. Such shape representations may provide a complete, composable, and continuous reproduction of an underlying geometry of a scene. Alternatively or additionally, the shape representations may be obtained from various data types, including, but not limited to, two-dimensional (2D) images and/or other modalities of the 3D shape.

In comparison, related shape representations may fail to satisfy one or more of the above-described advantages of PDDFs, in accordance with one or more embodiments. For example, implicit shape representations, including, but not limited to, occupancy fields and/or signed/unsigned distance fields, may not be able to perform directed geometric queries efficiently, as each query may require computing a surface intersection point which may require multiple passes of a coordinate neural network defining the represented shape. Thus, such implicit shape representations may be unable to provide fast, differentiable, and directed geometric queries. For another example of implicit shape representations, neural radiance fields (NeRFs) may also require several forward passes per query, as depth estimation is done via integration, and, as a result, may similarly be unable to provide fast, differentiable, and directed geometric queries. Alternatively or additionally, higher-order geometries (e.g., normals, curvatures) extracted from NeRFs may typically be noisy. Consequently, NeRFs may be unable to provide a complete, composable, and continuous reproduction of an underlying geometry of a scene.

For another example, related explicit shape representations (e.g., voxels, point clouds, meshes) may typically support fast geometric queries. However, explicit shape representations may be unable to provide complete, composable, and continuous reproductions as such shape representations may not encode scenes and/or objects continuously. Alternatively or additionally, voxels may scale with signal resolution rather than complexity, which may result in making an exact reproduction of the shape to be prohibitively expensive in terms of resources (e.g., processor time, memory usage, etc.) In another example, point clouds may not model shape topology and, as such, may be unable to reproduce the shape with sufficient fidelity (e.g., due to outlier points). In another example, meshes may be unable to obtain shape representations from various data types, as the neural network-based mechanisms for obtaining reconstructed meshes typically operate with a fixed output topology.

Figure 2:
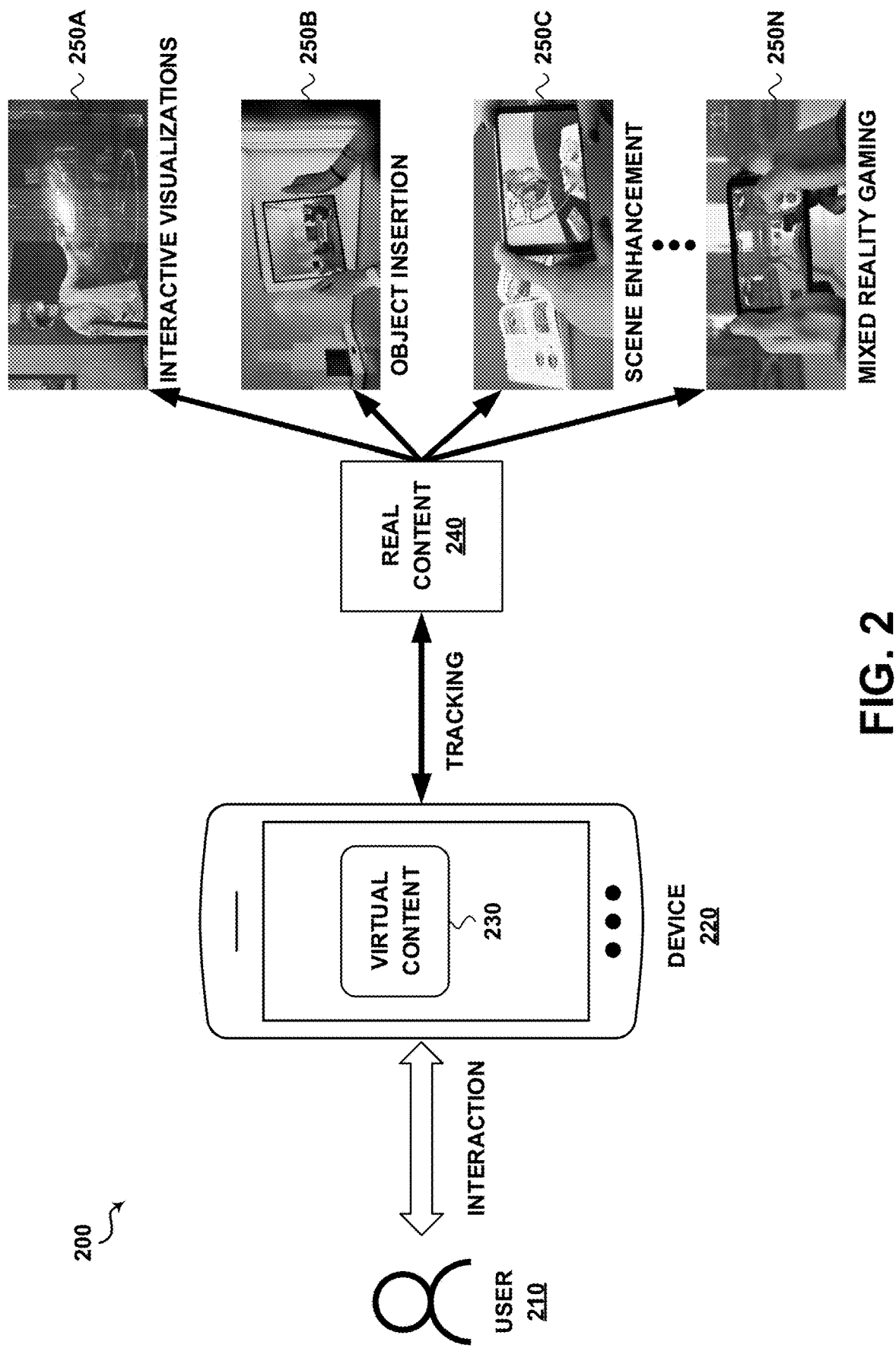
FIG. 2 illustrates an example of an augmented reality system, in accordance with various aspects of the present disclosure.

FIG. 2 illustrates an example of an augmented reality (AR) system, in accordance with various aspects of the present disclosure. The AR system 200 depicted in FIG. 2 may bridge a physical 3D world (e.g., real content) with virtual content.

As shown in FIG. 2, at least one user 210 may interact with virtual content 230 provided to the at least one user 210 by a device 220 to perform one or more AR-based applications 250A-N (hereinafter "250", generally), such as, but not limited to, interactive visualizations 250A, object insertion 250B, scene enhancement 250C, and mixed reality gaming 250N. N is an integer greater than zero.

In some embodiments, the device 220 depicted in FIG. 2 may be similar in many respects to the device 100 described with reference to FIG. 1 and may include additional features not mentioned above. For example, the device 220 may provide to the at least one user 210 virtual content 230 that combines real content 240 from the physical 3D world with additional virtual content generated by the device 220. The device 220 may provide the virtual content 230 using one or more visual displays (e.g., displays connected to the device 220, wearable devices (not shown) in communication with the device 220, and the like), audio output devices (e.g., output component 160 of FIG. 1, speakers (not shown)), and/or haptic feedback devices (not shown). The at least one user 210 may provide one or more inputs to the device 220 to modify the virtual content 230. The one or more inputs may be provided via one or more input devices connected to the at least one user 210 (e.g., mouse, stylus, glove) and/or connected to the device 220 (e.g., input component 150 of FIG. 1). In response to the one or more inputs, the device 220 may modify the virtual content 230 provided to the at least one user 210 and/or may provide additional virtual content to the at least one user 210.

By way of example, some example AR-based applications may include, but not be limited to, interactive visualizations 250A in which the at least one user 210 is able to interact (e.g., navigate) with virtual content 230 (e.g., a representation of a galaxy) provided by the device 220, object insertion 250B in which one or more virtual objects 230 are added to the real content 240 (e.g., virtual furniture in an empty room), scene enhancement 250C in which virtual content 230 is generated based on the real content 240 captured by the device 220 (e.g., virtual simulation of a heart pumping blood when an image of a heart from a textbook page is captured), and mixed reality gaming 250N in which a virtual game 230 is played in the real content 240 captured by the device 220. It is to be understood that other AR-based applications may be performed without deviating from the scope of the disclosure.

That is, to perform these, and other, AR-based applications 250, the device 220 may obtain a 3D representation of the real content 240, combine the virtual content 230 with the 3D representation of the real content 240, and provide the combined result to the at least one user 210. Consequently, the 3D representations of the scenes/objects may need to be performed with a high level of efficiency in order to provide a satisfactory interactive experience to the user of the device.

In some embodiments, the AR-based applications 250 may require that the device 220 perform 3D reconstruction of the real content 240, such that the virtual content 230 may be inserted into the scene depicted by the real content 240. For example, the 3D reconstruction may include obtaining occlusions (e.g., obstructions) within the scene. Alternatively or additionally, the AR-based application 250 may require that the device 220 render (e.g., provide to the user) an implicit shape from the scene. That is, the device 220 may construct a 2D image from the scene by performing a substantial amount of directed geometric queries. For example, the geometric rendering (e.g., depth, surface normal) may be necessary for visualizing the scene (e.g., colors, lighting effects, occlusions). Thus, it is advantageous that the shape representation used to render the scene be capable of fast, differentiable, and directed geometric queries in order to provide a satisfactory user experience.

Continuing to refer to FIG. 2, the interactive visualization 250A and the scene enhancement 250C may include displaying, to the at least one user 210, data associated with a real-word object (e.g., 2D image of 3D representation). In some embodiments, the device 220 may track the position and/or orientation of the hands of the at least one user 210 (and/or tools used by the at least one user 210), relative to the visualization components (e.g., displayed data) and potentially changing the visualization as needed. For example, the at least one user 210 may control the position and/or orientation of the interactive visualization (and/or the scene enhancement) may changing the position and/or orientation of the user's hands and/or tools. Alternatively or additionally, the at least one user 210 may perform gestures (e.g., predetermined hand motions) to further control the AR-based applications 250. In some embodiments, the device 220 may perform directed geometric queries to effect the rendering of the visualization. Alternatively or additionally, the device 220 may perform directed geometric queries to understand and/or determine the user interaction and its effect on the visualization. For example, the device 220 may perform one or more directed geometric queries to quickly calculate which part of an object is the user's hand approaching. In other optional or additional embodiments, the device 220 may perform directed geometric queries to have the visualization behave in a manner responsive to the environment, such as, but not limited to, occlusions from real objects and/or lighting changes.

As further shown in FIG. 2, the at least one user 210 may utilize the object insertion 250B to insert one or more virtual objects into a scene, such as, but not limited to, visualize a room with potential furniture additions and/or with a new paint color or wallpaper design on a wall. Another possible AR-based application 250 may include mixed reality gaming 250N in which the at least one user 210 may user wearable devices (not shown) in conjunction with, or instead of, the device 220 to achieve an immersive user experience in which a game environment is a real-world location of the user. In these scenarios, the virtual objects inserted into the scene may be dynamic and virtually interact with the real world. In some embodiments, the device 220 may perform directed geometric queries to determine scene lighting. For example, the device 220 may perform ray tracing based on such directed geometric queries to determine the bouncing paths of light in the scene. Alternatively or additionally, the device 220 may use a visibility field with respect to a light source to estimate shadows. In other optional or additional embodiments, the device 220 may perform directed geometric queries for modeling trajectory/collisions of virtual objects (e.g., path of bullets/grenades and/or shrapnel in an AR game). Thus, a complete geometric representation of each entity may be needed, in particular, for appearance modeling of complex shapes (e.g., using surface normal to model interactions with light). Alternatively or additionally, an accurate 3D representation of the scene may be needed to accurately insert the virtual objects into the scene.

In some embodiments, the shape representations of one or more 3D objects may be stored in an object library (not shown). The object library may be stored in one or more entities (e.g., server, database) that may be accessible from the device 220. The object library may be shared be one or more devices, and used, as needed, in AR-based applications 250. For example, a previously created shape representation of a sofa may be re-inserted and/or re-visualized in an object-insertion 250B application, or in an interactive visualization 250A, or in a mixed reality gaming application 250N.

In addition to the AR-based applications 250 discussed in reference to FIG. 2, aspects of the present disclosure may be applied to other applications, such as, for example, mobile robotics. Mobile robots may require representations of 3D scenes in which the mobile robots must navigate and/or 3D objects that the mobile robots must manipulate. For example, for navigation and/or environmental mapping, a mobile robot may need to construct a complete representation of the 3D environment to assist in long-range planning, learning locations of importance, and/or finding particular objects. Thus, shape representation techniques capable of fast, differentiable, and directed geometric queries, as well as, the ability to obtain such a representation from various data types, including red-green-blue (RGB) images or RGB data, are desirable for such mobile robot applications.

In addition, successful navigation may further require movement planning and collision avoidance, particularly when obstacles may be present and/or in crowded scenarios. As such, the mobile robots may also perform directed geometric queries for casting rays with which the mobile robot, or agent, may detect the presence of potential collisions and their proximity.

Completeness of the representations obtained by the mobile robots may be desirable in order to model occluded objects/geometry that may be needed to find target objects and/or track objects that may temporarily disappear from view. Alternatively or additionally, object tracking may improve efficiency of object-centered representations of scenes when the objects are often moved.

Assuming that p denotes a 3D source position (e.g., location) and that v denotes a 3D direction, then (p,v) may define a ray $r_{p,v}$ (e.g., a vector) that emanates from position p in the direction v. Considering a 3D scene, object, or shape S, a directed geometric query may refer to a computation of a visibility $\xi(p,v)$ and a depth $d(p,v)$ with respect to the 3D shape S. For example, the visibility $\xi(p,v)$ may indicate whether the ray $r_{p,v}$ intersects the 3D shape S. That is, the visibility $\xi(p,v)$ may indicate whether the 3D shape S is visible from position p along direction v. The depth $d(p,v)$ may denote how far away (e.g., a distance) the 3D shape S is from position p along direction v.

Aspects described herein provide PDDFs that allow for rendering of shape representations with fast, differentiable, and directed geometric queries by computing the visibility $\xi$ and depth d values efficiently and differentiably. For example, in some embodiments, producing a depth image from the visibility $\xi$ and depth d fields may require a single directed query per pixel. In addition to geometric rendering, efficiency of the directed geometric queries may be desirable for real-time lighting in AR-based applications (e.g., ray tracing) as discussed in reference to FIG. 2.

The shape representations computed using the visibility $\xi$ and depth d fields provide a complete, composable, and continuous reproduction of the underlying geometry of the scene and/or shape, including geometric details, and/or higher-order geometry like surface normal and curvatures. As such, the visibility $\xi$ and depth d fields may be queried continuously. Alternatively or additionally, the visibility $\xi$ and depth d fields from multiple entities may be combined while maintaining these properties (e.g., completeness, continuity, efficiency, differentiability). That is, the visibility $\xi$ and depth d fields contain all the geometric information that related shape representations may provide (e.g., which may be provided by explicit shape representations such as point clouds and meshes) while the continuity property provides arbitrary resolution modeling (e.g., which may be provided by implicit shape representations).

The shape representations computed using the visibility $\xi$ and depth d fields may be obtained from various data types, including 2D images and other modalities of 3D shapes. As such, whenever a novel environment is encountered (e.g., by a mobile robot, a device), the shape representations may be constructed based on 2D images captured by an image sensor (e.g., camera) on the device. In another example, virtual content may be created (e.g., from mesh data) and realistically inserted into the real content by lifting scene images into 3D space.

One or more related shape representations (e.g., implicit, explicit) may not be suitable for the AR-based applications described in reference to FIG. 2 because the related shape representation is unable to provide one or more of the following features.

For example, some related shape representations are unable to provide complete shape representations capable of fast differentiable directed geometric queries. For example, related implicit shape approaches to computing visibility $\xi$ and depth d fields may be slow, when compared to aspects of the present disclosure, as measured by a number of forward passes needed to compute such a query when implemented by a neural network. The differentiability of such a representation should not be compromised by the inherent discontinuities in the geometric query outputs, as the query inputs smoothly vary.

For another example, some related shape representations are unable to provide efficient conditional geometric rendering of the shape representation within a machine learning system. That is, a common need for geometric queries is the need for rendering, including silhouette, depth, and normals images, from a shape. Three additional properties are important: (a) the ability to condition on some encoding of the shape (e.g., from images for 3D reconstruction, or from a random vector for generative modelling), which allows learning from datasets rather than single shapes, (b) efficiency and parallelism in terms of rendering, and (c) ease of incorporation into existing machine learning architectures, usually mediated by differentiability. Conditional models allow learning regularities across shapes/scenes, providing shared priors on the properties of the representation.

For another example, some related shape representations are unable to provide a means of procuring shape representations from data. A shape representation is only useful if it can actually be instantiated. Thus, shape representations according to aspects of the present disclosure may be procured from multiple kinds of data (e.g., single-view or multi-view images, video, RGBD data, 3D point clouds, or other explicit/implicit shape representations). The disclosure is not limited in this regard.

For another example, some related shape representations are unable to provide a composable representation. In order to be scalable, shape representations should be composable. That is, in a room with many objects, the complete representation (which may be encoded by a set of neural network weights) should not need to be relearned/refit each time a single object is altered (e.g., placed in a new location). According to aspects of the present disclosure, the shape representations have instead a combination of separate fields that enables applications with compositional dynamics, as well as improves scalability (e.g., allocation of network resources).

In light of the deficiencies of related shape representations described above, aspects of the present disclosure provide for a neural system for directed geometric queries, implementing directed distance fields (DDFs), which are efficient and differentiable, as described above. For example, geometric image rendering may be performed in an efficient manner by having the neural system run one forward pass per pixel based on a given set of camera parameters (e.g., position p, direction v). In addition, the proposed neural system may be incorporated into existing learning architectures and tasks, due to its differentiable nature, which allows the neural system to be learned from data. For example, given a dataset of 2D images and corresponding 3D shapes, the DDF may be used in a single-image reconstruction system. Aspects of the present disclosure further provide an algorithm for composition of multiple DDF fields, which retains the properties (e.g., differentiability) of a single DDF without need for retraining and/or optimizing.

Figure 3A:
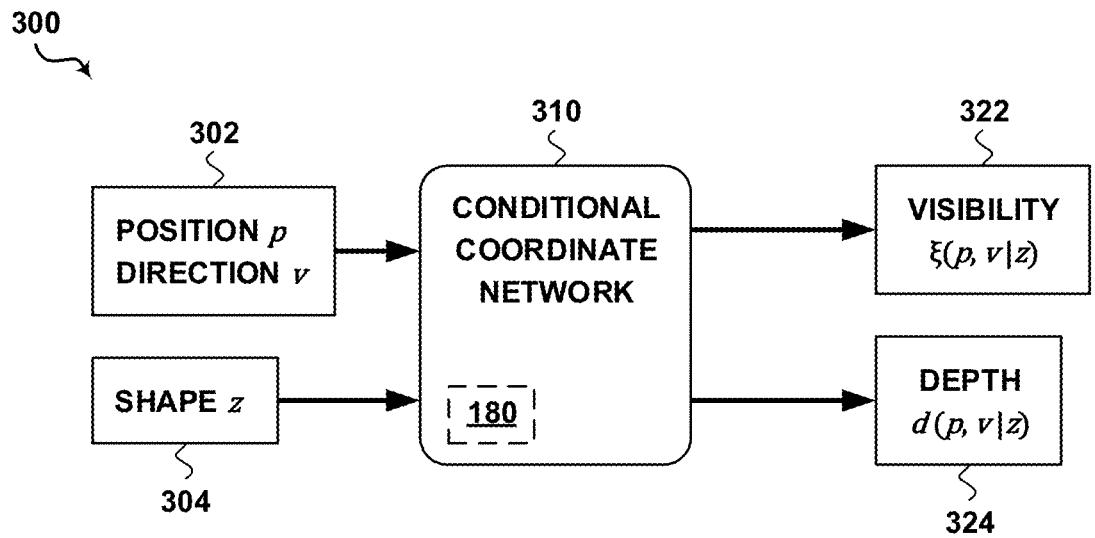
FIGS. 3A and 3B illustrate a first example and a second example, respectively, of a conditional coordinate network, in accordance with various aspects of the present disclosure.
Figure 3B:
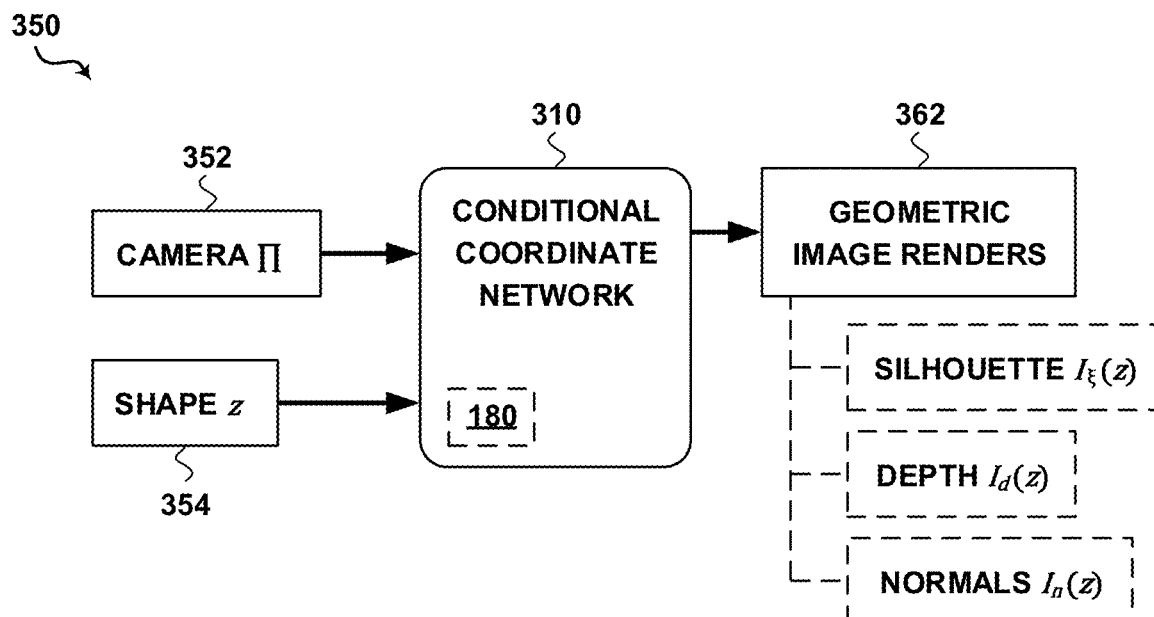

FIGS. 3A and 3B illustrate a first example and a second example, respectively, of a conditional coordinate network, in accordance with various aspects of the present disclosure.

Referring to FIG. 3A, a first example 300 of a conditional coordinate network 310 that implements one or more aspects of the disclosure is illustrated. In some embodiments, at least a portion of the conditional coordinate network 310 may be performed by the device 100 of FIG. 1, which may include the PDDF component 180. Alternatively or additionally, another computing device (e.g., device 220 of FIG. 2, a wearable device, a server, a laptop, a smartphone, a user equipment (UE), etc.) that includes the PDDF component 180 may perform at least a portion of the conditional coordinate network 310.

As shown in FIG. 3A, the conditional coordinate network 310 may receive, obtain, access, or be provided with a camera representation 302 and a latent shape vector z 304. The camera representation 302 may include a 3D position p and a direction v of a view of a scene. The latent shape vector z 304 may indicate the identity of the shape or scene. That is, the latent shape vector z 304 may comprise a vector representation of the shape or scene.

In some embodiments, the conditional coordinate network 310 may be configured to calculate, based on the latent shape vector z 304, a visibility score $\xi(p,v)$ 322 and a depth value $d(p,v)$ 324 for a ray $r_{p,v}$ (e.g., a vector) that emanates from position p in the direction v. The visibility score $\xi(p,v)$ 322 may indicate whether the ray $r_{p,v}$ intersects the latent shape vector z 304. The depth value $d(p,v)$ 324 may denote how far away (e.g., a distance) the latent shape vector z 304 is from position p along direction v.

Figure 4:
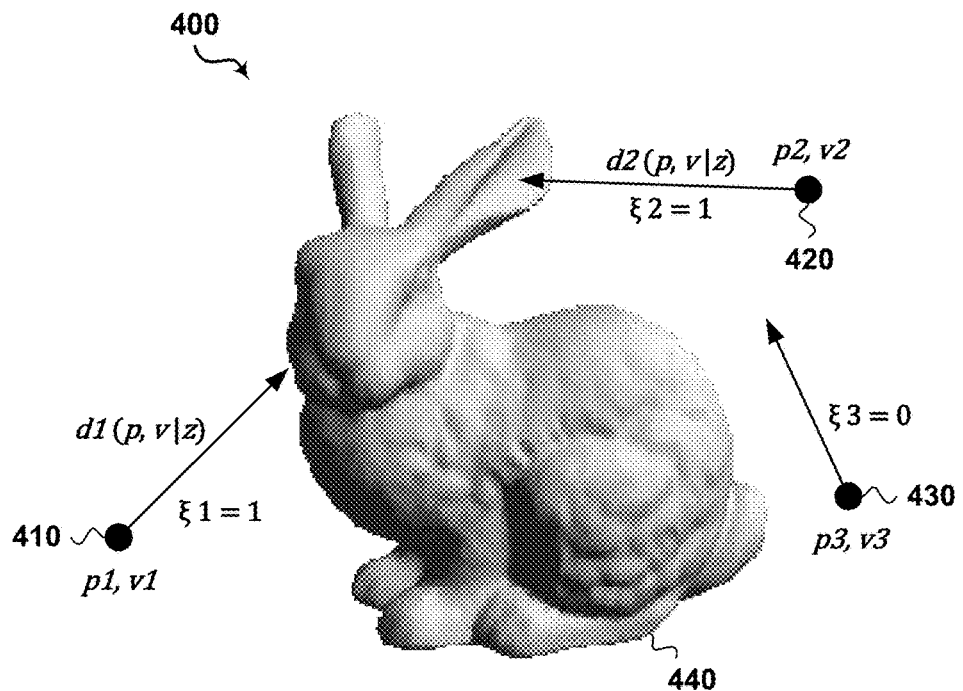
FIG. 4 depicts an example of a shape representation, in accordance with various aspects of the present disclosure.

For example, as shown in FIG. 4, a first ray 410 may emanate from position p1 in direction v1, a second ray 420 may emanate from position p2 in direction v2, a third ray 430 may emanate from position p3 in direction v3. In some embodiments, the conditional coordinate network 310 may calculate that the first ray 410 intersects the latent shape vector z 440. For example, the conditional coordinate network 310 may calculate that the first ray 410 has a visibility score $\xi1$ equal to first value (e.g., 1) and a depth value d1. In other optional or additional embodiments, the conditional coordinate network 310 may calculate that the second ray 420 intersects the latent shape vector z 440. For example, the conditional coordinate network 310 may calculate that the second ray 420 has a visibility score $\xi2$ equal to the first value (e.g., 1) and a depth value d2. In other optional or additional embodiments, the conditional coordinate network 310 may calculate that the third ray 430 does not intersect the latent shape vector z 440. For example, the conditional coordinate network 310 may calculate that the third ray 430 has a visibility score ξ3 equal to second value (e.g., 0) and an undefined depth value. It is to be understood that the first value (e.g., 1) and the second value (e.g., 0) assigned to the visibility scores may be changed without deviating from the scope of the disclosure. For example, in some embodiments, the first value may be equal to 0 and the second value may be equal to 1. In other embodiments, the first value and the second value may be set to yet other values (e.g., 0 and −1). The present disclosure is not limited in this regard.

Referring to FIG. 3B, a second example 350 of a conditional coordinate network 310 that implements one or more aspects of the disclosure is illustrated. In some embodiments, at least a portion of the conditional coordinate network 310 may be performed by the device 100 of FIG. 1, which may include the PDDF component 180. Alternatively or additionally, another computing device (e.g., device 220 of FIG. 2, a wearable device, a server, a laptop, a smartphone, a UE, etc.) that includes the PDDF component 180 may perform at least a portion of the conditional coordinate network 310.

As shown in FIG. 3B, the conditional coordinate network 310 may receive, obtain, access, or be provided with a camera representation Π 352 and a latent shape vector z 354. The camera representation Π 352 may include a plurality of 3D positions p and directions v of a view of a scene. Alternatively or additionally, the conditional coordinate network 310 may determine the plurality of 3D positions p and directions v of the view of the scene from the camera representation Π 352. The latent shape vector z 354 may indicate the identity of the shape or scene. That is, the latent shape vector z 354 may comprise a vector representation of the shape or scene.

Figure 5:
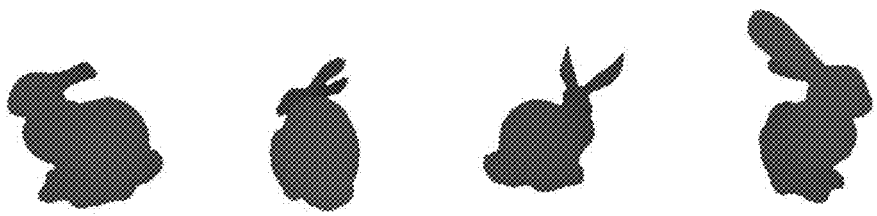
FIG. 5 illustrates examples of geometric image renders, in accordance with various aspects of the present disclosure.
Figure 5:
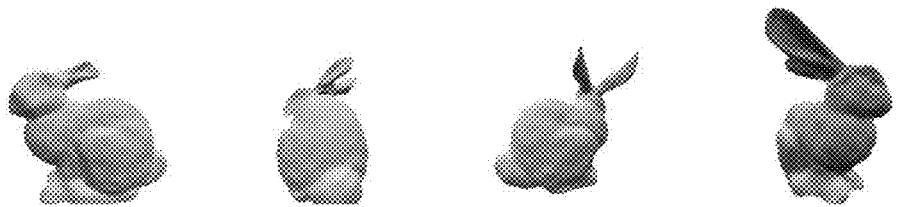
Figure 5:
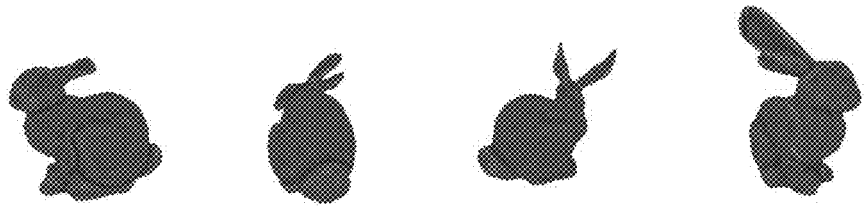

In some embodiments, the conditional coordinate network 310 may be configured to calculate, based on the latent shape vector z 354, a visibility score $\xi(p,v)$ and a depth value $d(p,v)$ for each ray $r_{p,v}$ (e.g., a vector) that emanates from the plurality of 3D positions p and directions v of a view of a scene included in the camera representation Π 352. The visibility score $\xi(p,v)$ may indicate whether the ray $r_{p,v}$ intersects the latent shape vector z 354. The depth value $d(p,v)$ may denote how far away (e.g., a distance) the latent shape vector z 354 is from position p along direction v. Alternatively or additionally, the conditional coordinate network 310 may be configured to generate renders of geometric information of the scene using the visibility score $\xi(p,v)$ and the depth value $d(p,v)$ of the plurality of rays. That is, the conditional coordinate network 310 may generate geometric image renders 362, such as, but not limited to, silhouette image renders $I_\xi(z)$, depth image renders $I_d(z)$, and/or normal image renders $I_n(z)$. For example, the conditional coordinate network 310 may assemble many independent field queries, one per pixel, to obtain a depth image $I_d(z)$. The independent field queries may be parallelized to potentially decrease processing time and increase efficiency. Surface normal and curvatures, as well as other useful 3D descriptors of the local differential surface geometry, may be obtained by performing additional operations on the conditional coordinate network 310. For example, FIG. 5 illustrates examples of geometric image renders, in accordance with various aspects of the present disclosure.

Referring to FIGS. 3A and 3B, the conditional coordinate network 310, which may be referred to as a DDF, may parameterize two scalar fields, visibility ξ and depth d, which together may provide a complete description of the shape geometry. The two fields may be defined over a 5D space (e.g., 3D position p and 3D direction v). Alternatively or additionally, the two fields may be conditioned on shape identity through the latent shape vector z through a different architectural mechanism than the continuous input variables p and v. Although the DDF is configured to operate on single (e.g., 5D) queries, a complete depth rendering may be obtained efficiently by performing a single forward pass per pixel of the rendering. The conditional coordinate network 310 is differentiable and, as such, the conditional coordinate network 310 is configured to produce renderings that are differentiable as well.

Figure 6:
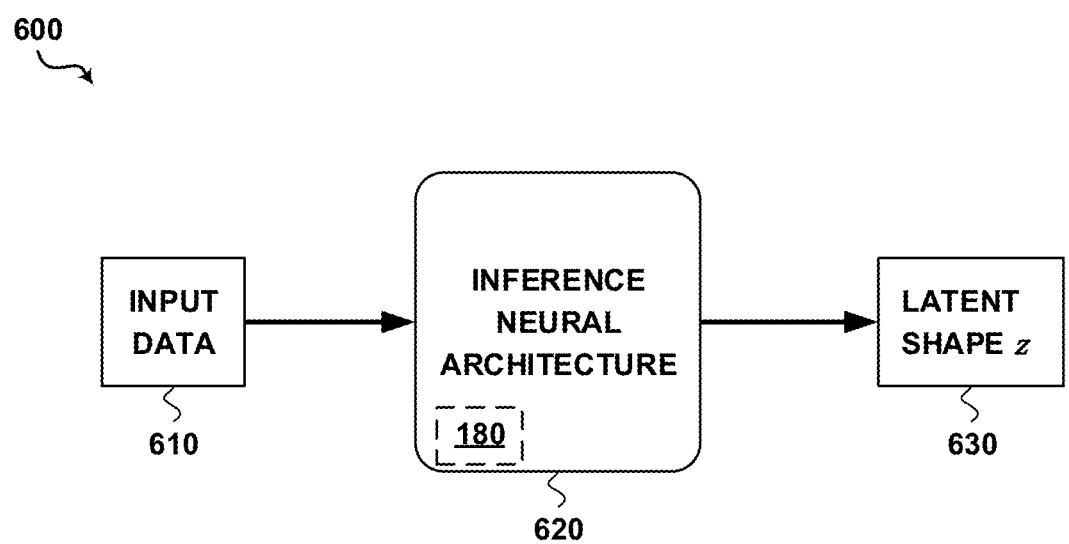
FIG. 6 depicts an example of an inference neural architecture, in accordance with various aspects of the present disclosure.

FIG. 6 illustrates an example of an inference neural architecture, in accordance with various aspects of the present disclosure.

Referring to FIG. 6, an example 600 of an inference neural architecture 620 that implements one or more aspects of the disclosure is illustrated. In some embodiments, at least a portion of the inference neural architecture 620 may be performed by the device 100 of FIG. 1, which may include the PDDF component 180. Alternatively or additionally, another computing device (e.g., device 220 of FIG. 2, a wearable device, a server, a laptop, a smartphone, a UE, etc.) that includes the PDDF component 180 may perform at least a portion of the inference neural architecture 620.

As shown in FIG. 6, the inference neural architecture 620 may receive, obtain, access, or be provided with input data 610. The input data 610 may comprise at least one of 2D images, 2D image data, 3D images, and 3D image data (e.g., meshes). The inference neural architecture 620 may be configured to encode the input data 610 to generate the latent shape vector z 630. That is, the input data 610 may be encoded by the weights of the inference neural architecture 620 to generate a differentiable mapping that may be used to generate a description of the geometry of at least one object in the input data. The differentiable mapping may be constructed using standard machine learning approaches for learning such as function approximators. Alternatively or additionally, standard machine learning tools may be used to infer the latent shape vector z 630 to obtain the description of the geometry of a target (e.g., from an image of an object). The latent shape vector z 630 may then be combined with a trained conditional coordinate network as described in reference to FIG. 7.

In some embodiments, the latent shape vector z 630 may be encoded from a variety of types of inputs, such as, but not limited to, images, 3D surface meshes, point clouds, and the like. That is, the latent shape vector z 630 may be encoded from input data that may be used to infer a correct depth for the set of query rays. For example, the depths for the set of query rays may be obtained from a 3D surface mesh by computing ray intersections with the surface of the scene. Alternatively or additionally, appropriate output depths may be obtained for rays that nearly intersect a point of an input point cloud.

Figure 7:
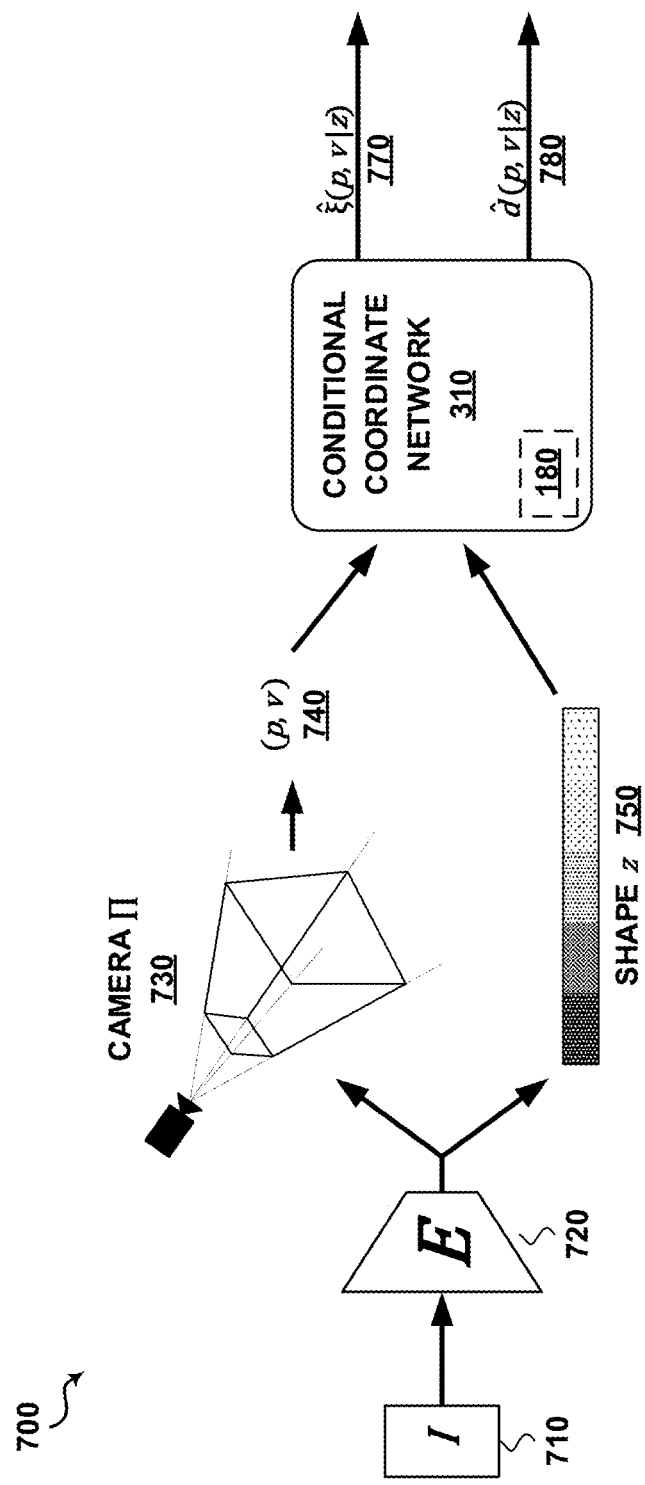
FIG. 7 illustrates an example architecture for single-image 3D reconstruction via probabilistic directed distance fields (PDDFs), in accordance with various aspects of the present disclosure.

FIG. 7 illustrates an example architecture for single-image 3D reconstruction via PDDFs, in accordance with various aspects of the present disclosure.

Referring to FIG. 7, an architecture 700 for single-image 3D reconstruction via PDDFs that implements one or more aspects of the disclosure is illustrated. In some embodiments, at least a portion of the architecture 700 may be performed by the device 100 of FIG. 1, which may include the PDDF component 180. Alternatively or additionally, another computing device (e.g., device 220 of FIG. 2, a wearable device, a server, a laptop, a smartphone, a UE, etc.)

that includes the PDDF component 180 may perform at least a portion of the architecture 700.

Figure 8:
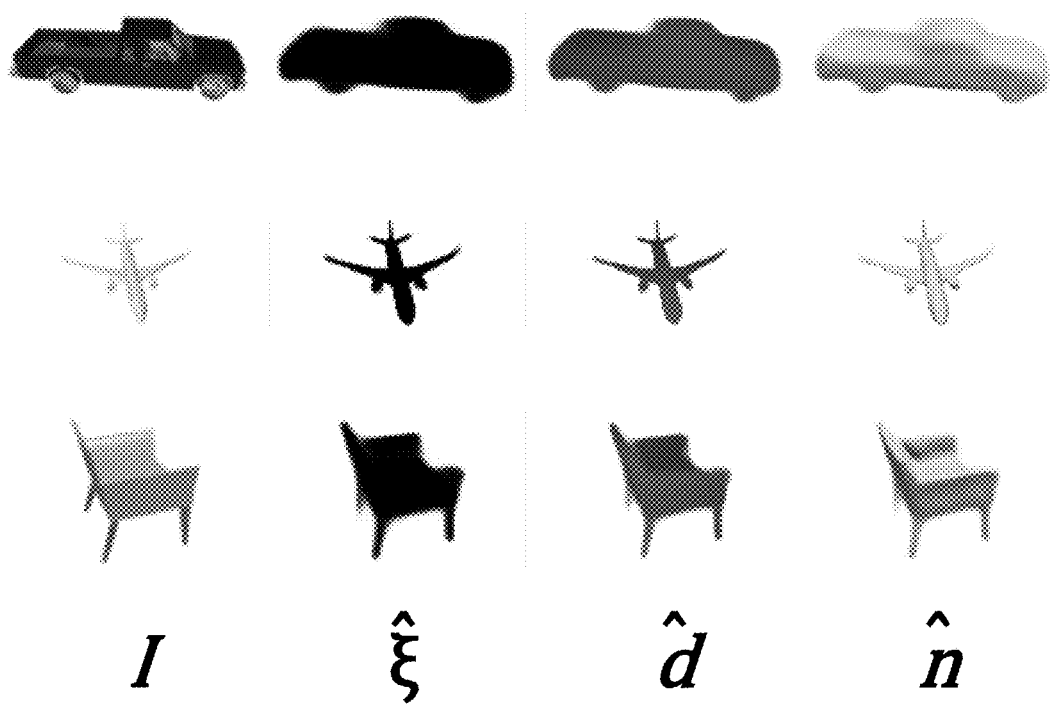
FIG. 8 depicts examples of input images and outputs of a conditional coordinate network, in accordance with various aspects of the present disclosure.

As shown in FIG. 7, the architecture 700 may include a convolutional neural network (CNN) 720 that may be configured to generate a camera representation Π 730 and a latent shape vector z 750 from input data 710. FIG. 8 depicts examples of input images I, in accordance with various aspects of the present disclosure. The CNN 720 may be similar in many respects to the inference neural architecture 620 described with reference to FIG. 6 and may include additional features not mentioned above.

The camera representation Π 730 may be used to obtain positions p and directions v for rendering, as described in reference to FIG. 3B.

The architecture 700 may include a conditional coordinate network 310 that may be configured to calculate visibility scores $\xi(p,v)$ 770 and depth values $d(p,v)$ 780, conditioned on the latent shape vector z 750, as described in reference to FIGS. 3A and 3B, and as shown in FIG. 8. For example, the conditional coordinate network 310 may assemble a plurality of independent field queries (e.g., one per pixel) to obtain a complete rendering of the shape. Each of the independent field queries may require performing a single forward pass of the conditional coordinate network 310 per pixel of the rendering, as described in reference to FIGS. 3A and 3B. Referring to FIG. 8, the conditional coordinate network 310 may generate visibility scores $\hat{\xi}$, depth values $\hat{d}$, and normal renders $\hat{n}$, conditioned on latent shape vectors based on input images I.

In some embodiments, the conditional coordinate network 310 may be configured to output other surface properties of the shape. For example, the conditional coordinate network 310 may output a reflectance value of the shape, in response to the directed query. That is, the conditional coordinate network 310 may be configured to calculate, based on the latent shape vector representation of the scene, a reflectance value for each ray of the plurality of rays emanating from the corresponding plurality of positions and directions.

In some embodiments, a mobile robot (not shown) may utilize the architecture 700 shown in FIG. 7 to represent the environment surrounding the mobile robot using DDFs. That is, the architecture 700 may be configured to obtain a DDF from input data 710 comprising RGB images and/or RGBD images captured by the mobile robot. Obtaining the DDF from the input data 710 may be equivalent to learning a mapping (or an encoder) from the input data 710 to the latent shape vector z 750. Such a mapping may be learned using related machine learning frameworks, combined with tailored losses that allow back-propagation-based learning through the architecture 700 (e.g., DDF framework). That is, the encoder may be learned based on the error of the downstream DDF model.

The conditional coordinate network 310 may be trained using pairs of images and known 3D shapes, but the present disclosure is not limited in this regard.

For another example, in the context of single-image 3D reconstruction, an encoder E (e.g., CNN 720) may map an image 710 to a camera representation Π 730 and a latent shape vector z 750. Various geometric properties of the conditional coordinate network 310 may be used to formulate a set of geometric losses. Alternatively or additionally, an additional loss and overall objective function L may be computed based on a difference between the depths output by the conditional coordinate network 310 (conditioned on latent shape vector z 750) and the depths computed via S, the true underlying shape. The derivative of the objective function L with respect to the weights of encoder E (e.g., CNN 720) may then be computed and used in a standard manner for gradient-based neural network learning of the conditional coordinate network 310.

A similar approach may be applied to other forms of input data 710, such as, but not limited to, multi-view images, 3D scans, RGBD video, and the like. In such embodiments, the structure of the encoder E and of the objective function L may be modified based on the format of the input data 710.

Aspects of the present disclosure provide for composing DDFs and transforms that allow placement, scaling, or deformation relative to the original fields (e.g., weights defining a shape or a scene). That is, given a set of fields, fields corresponding to a plurality of shape representations of the scene may be combined resulting in a representation of the scene comprising the plurality of shape representations. In such a manner, capabilities such as differentiable rendering may be retained with minimal overhead. The combined DDF may further improve efficiency of dynamic scene updates, as the combining may avoid refitting and/or retraining a DDF for an entire scene if an object within the scene is moved, for example. The combined DDF may further improve efficiency, as the combined DDF may allow for redistribution of neural capacity to better match scene content complexity.

Figure 9:
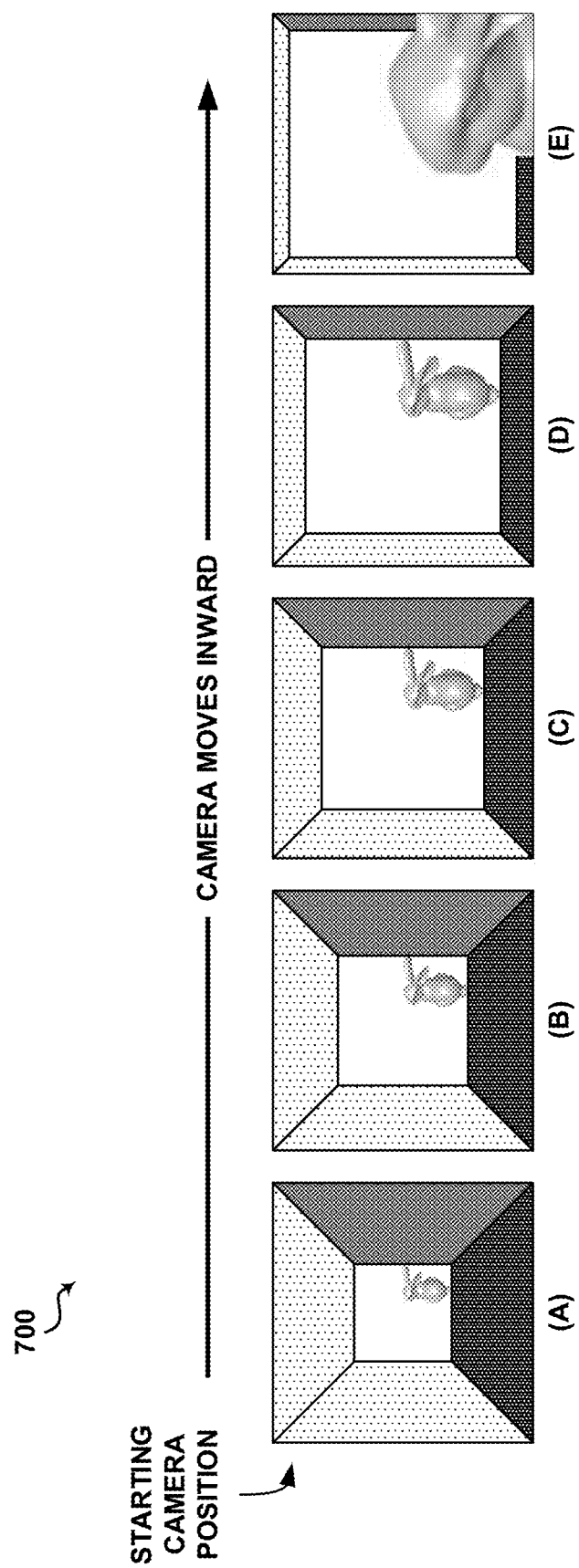
FIG. 9 illustrates an example scene composition, in accordance with various aspects of the present disclosure.

For example, FIG. 9 illustrates an example scene composition, in accordance with various aspects of the present disclosure. As shown in FIG. 9, a first DDF of a Stanford bunny model may be combined with another DDF of a room (e.g., walls and floors). The two DDFs may be efficiently combined without retraining or refitting of the DDF. The combination may result in a new DDF combination that maintains the properties of the two original DDFs. For example, the combined DDF may be differentially rendered in a similar manner to the two original DDFs.

In some embodiments, a DDF composition algorithm, as shown in Table 1, may take as input a query position p and direction v, and a set of m DDFs, where m is an integer greater than 1. Alternatively or additionally, the DDF composition algorithm may take as input transforms T that may encode a rigid placement or some other form of deformation. The DDF composition algorithm may return as output the visibility $\xi$ and depth d values of the combined and transformed fields.

TABLE 1

| Algorithm 1: DDF Composition Algorithm |
| --- |
| Input: Query oriented point (p, v); parameters $\eta_T$, $\epsilon_S$<br>Given: Set of DDFs and transforms $\{\xi_i, d_i, T_i\}_{i=1}^{m}$<br>Output: Composed DDF outputs $\xi(p,v)$ and $d(p,v)$ at query inputs<br><br>$$\xi(p, v) = 1 - \prod_{i=1}^{m}(1 - \xi_i(T_i(p, v)))$$<br><br>$$\{w_i\}_{i=1}^{m} = \text{softmax}\left(\left\{\frac{\eta_T^{-1}\xi_i(T_i(p, v))}{\epsilon_s + d_i(T_i(p, v))}\right\}_{i=1}^{m}\right)$$<br><br>$$d(p, v) = \sum_{i=1}^{m} w_i d_i(T_i(p, v))$$<br><br>Return: $\xi(p,v)$ and $d(p,v)$ |

As shown in Table 1, the composed visibility $\xi(p,v)$ may indicate the probability that any component field is visible by the query. The composed depth $d(p,v)$ may be calculated by selecting the component depth $d_i$ that is both visible by the query and has a lowest distance from the query. The composed depth d(p,v) may be calculated based on a set of weights $w_i$ that are computed for each of the component fields.

The DDT composition algorithm shown in Table 1 is but one example of combining and/or transforming fields corresponding to multiple shapes. It is to be understood that other algorithms may be used to combine and/or transform the fields corresponding to the multiple shapes without deviating from the scope of the disclosure. For example, another algorithm may use properties of the bounding boxes to further improve the efficiency of the depth queries.

Aspects of the present disclosure provide a formulation for shape representation that is based on directed geometric queries, as well as a method for implementing and utilizing this model in practice.

The DDF model utilizes a neural network to define a conditional coordinate network (e.g., conditional coordinate network 310 of FIGS. 3A and 3B) that maps position p and direction v values into visibility $\xi$ and depth d values. In some embodiments, the conditional coordinate network 310 may be implemented using a modulated sinusoidal representation network (SIREN) architecture, for example. That is, the conditional coordinate network 310 may comprise one or more layers of affine transforms and sine non-linearities, with the conditioning signal (e.g., latent shape vector z) being used to generate a multiplicative filter between the one or more layers. However, the disclosure is not limited in this regard. In other optional or additional embodiments, the conditional coordinate network 310 may be implemented using other conditional neural network architectures, such as, but not limited to, rectified linear unit (ReLU)-based networks with random Fourier features, for example. As a result, a directed geometric query may require a single forward pass of the conditional coordinate network 310 to determine the visibility $\xi$ and depth d values corresponding to the queried position p and direction v values, conditioned on the latent shape vector z. The use of a neural network for implementing the conditional coordinate network 310 may ensure the differentiability of the query operations.

In some embodiments, the depth values d(p,v|z) may be naturally discontinuous with respect to p and v due to characteristics of the shapes in the scene. That is, depth values may change by a large amount in response to a small translation over the surface of the shapes. For example, as shown in FIG. 10A, depth values may change significantly due to the inherent surface contours of the shape. For another example, as shown in FIG. 10B, depth values may change significantly due to occlusions caused by a portion of one shape obscuring another portion of another shape. These discontinuities in the depth function of the scene may result in preventing the use of related neural networks to represent the depth function of a scene, as discontinuous functions may typically be non-differentiable over the region that includes the discontinuity (e.g., large change in depth value). Conversely, continuous functions may typically be differentiable. As such, the conditional coordinate network 310 may be configured to correct depth information of the renders of the geometric information of the scene across at least one occlusion boundary, based on a switching mechanism over a set of estimated depth values.

In some embodiments, the conditional coordinate network 310 may be further configured to generate, in response to a directed query, a probability distribution over a range of depth values, rather than a single depth value. The probability distribution may prevent discontinuities in the query results that may be caused by occlusions, for example. In such embodiments, the conditional coordinate network 310 may be further configured to select a depth value, based on the probability distribution, as the depth value to output in response to the directed query. For example, the conditional coordinate network 310 may select a depth value corresponding to a maximum probability of the probability distribution. That is, the conditional coordinate network 310 may combine the probability distribution with a mixture of Dirac Delta ($\delta$) distributions as the parametric output distribution. For example, for N components, 2N−1 scalar outputs may be needed, where N is an integer greater than 0.

Figure 10C:
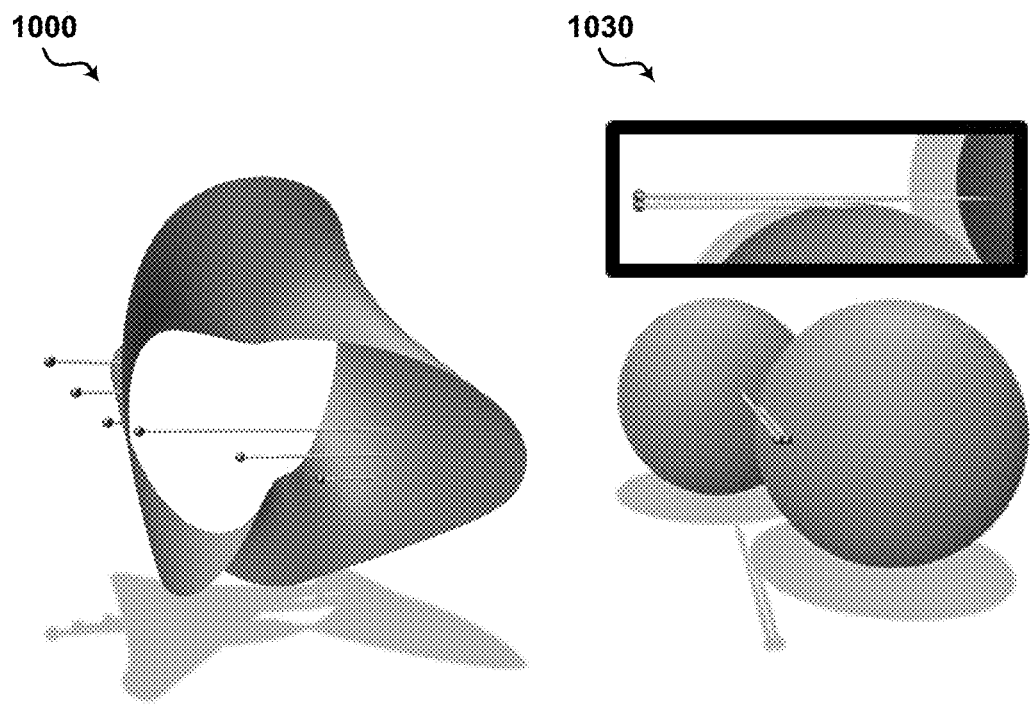
Figure 10C:
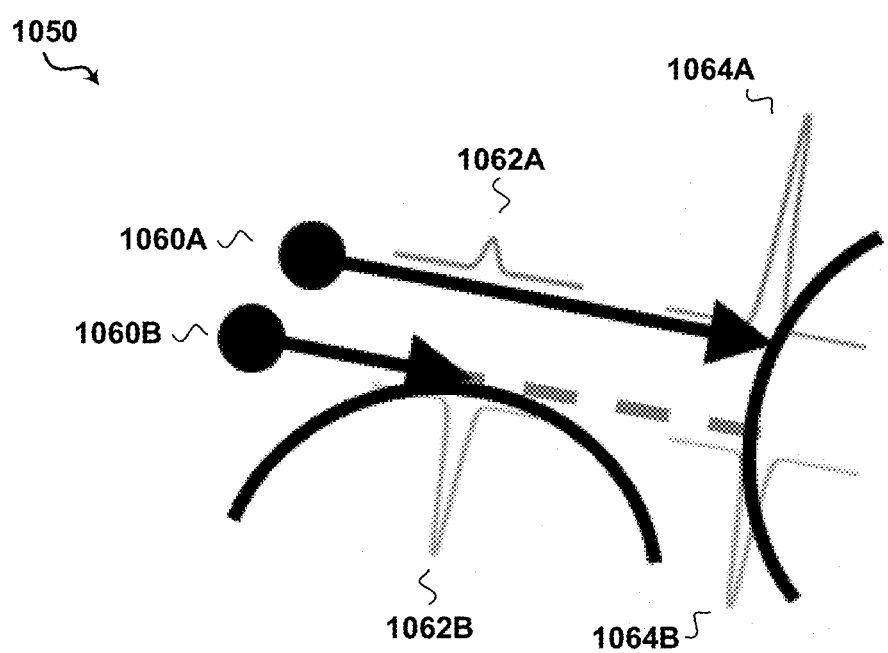

As shown in FIG. 10C, even with a two component Dirac Delta mixture, the conditional coordinate network 310 may smoothly (continuously) transition through mixture weight values to obtain a discontinuous output depth. That is, the two component Dirac Delta mixture model may be used to smoothly change coefficients (e.g., the two means and the mixture weights of the model) to model the discontinuous output depth. A discontinuity may arise in the output depth from selecting a mean of the mixture component having a maximum weight (e.g., w1 or w2=w1−1) as an output depth.

For example, as shown, in FIG. 10C, a first ray 1060A may have a first weight value 1062A corresponding to a first depth and a second weight value 1064A corresponding to a second depth, and a second ray 1060B may have a first weight value 1062B corresponding to a first depth and a second weight value 1064B corresponding to a second depth. In some embodiments, the second depth may be selected for the first ray 1060A based on the second weight value 1064A being larger than the first weight value 1052A, for example. Alternatively or additionally, either the first depth or the second depth may be selected for the second ray 1060B when the first weight value 10628 and the second weight value 10648 have a similar value, for example. Although not shown, a third ray that may be parallel to the second ray 10608 and located below the second ray 1060B may have a first weight value that is larger than the second weight value, and, as a result, the first depth of the third ray may be selected. In this manner, selecting depths based on the depth of a ray having a maximum weight value may allow for approximating a discontinuous output depth with smooth weights and means.

However, the disclosure is not limited in this regard. That is, other parametric output distributions may be used without deviating from the scope of the present disclosure. For example, in some embodiments, the switching mechanism may not be based on a probabilistic model. Alternatively or additionally, the selection may be based on criteria other than a maximum value (e.g., a minimum value).

In some embodiments, the conditional coordinate network 310 may be referred to as a probabilistic DDF (PDDF).

In some embodiments, the conditional coordinate network 310 may be configured to perform differentiable rendering. For example, a plurality of single directed queries, which may be based on a single camera representation, may be assembled to result in a one-pass-per-pixel rendering. In this manner, the conditional coordinate network 310 may generate several geometric image datatypes such as, but not limited to, silhouettes, depth renders, and normals images, which may be used by machine learning systems. In addition, the geometric image datatypes may be combined to result in combined DDFs that may retain their differentiability.

Figure 11:
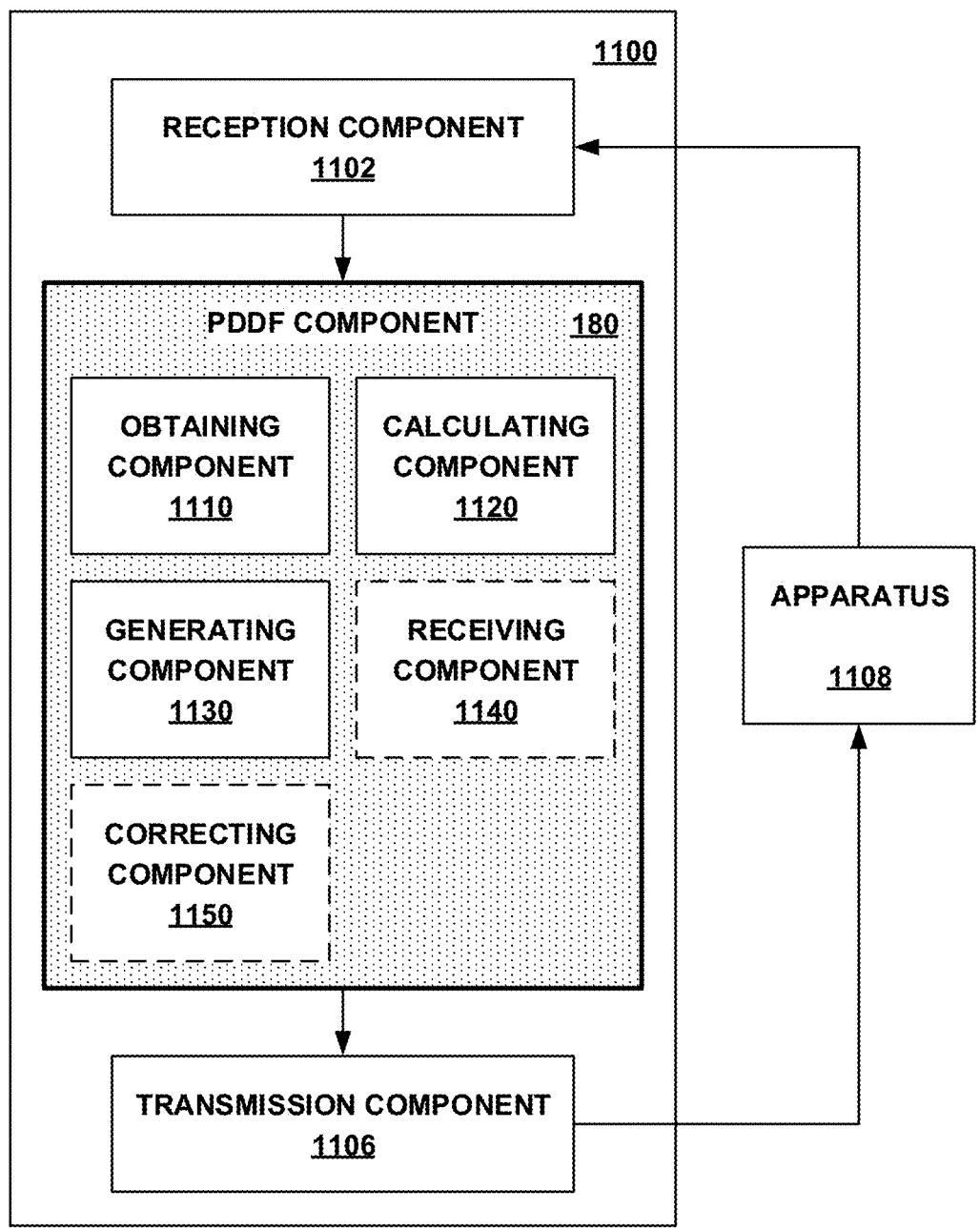
FIG. 11 illustrates a block diagram of an example apparatus for representing shapes with PDDFs, in accordance with various aspects of the present disclosure.

FIG. 11 illustrates a block diagram of an example apparatus 1100 for representing shapes with PDDFs. The apparatus 1100 may be a computing device (e.g., device 100 of FIG. 1, device 220 of FIG. 2) and/or a computing device may comprise the apparatus 1100. In some embodiments, the apparatus 1100 may comprise a reception component 1102 configured to receive communications (e.g., wired, wireless) from another apparatus (e.g., apparatus 1108), a PDDF component 180 configured to represent shapes with PDDFs, and a transmission component 1106 configured to transmit communications (e.g., wired, wireless) to another apparatus (e.g., apparatus 1108). The components of the apparatus 1100 may be in communication with one another (e.g., via one or more buses or electrical connections). As shown in FIG. 11, the apparatus 1100 may be in communication with another apparatus 1108 (such as a database, a server, a wearable device, or another computing device) using the reception component 1102 and/or the transmission component 1106.

In some embodiments, the apparatus 1100 may be configured to perform one or more operations described herein in connection with FIGS. 1-10. Alternatively or additionally, the apparatus 1100 may be configured to perform one or more processes described herein, such as method 1200 of FIG. 12. In some embodiments, the apparatus 1100 may comprise one or more components of the device 100 and the device 220 described above in connection with FIGS. 1 and 2, respectively.

The reception component 1102 may receive communications, such as control information, data communications, or a combination thereof, from the apparatus 1108 (e.g., a database, a server, a wearable device, or another computing device). The reception component 1102 may provide received communications to one or more other components of the apparatus 1100, such as the PDDF component 180. In some embodiments, the reception component 1102 may perform signal processing on the received communications, and may provide the processed signals to the one or more other components. In some embodiments, the reception component 1102 may comprise one or more antennas, a receive processor, a controller/processor, a memory, or a combination thereof, of the device 100 described above in reference to FIG. 1.

The transmission component 1106 may transmit communications, such as control information, data communications, or a combination thereof, to the apparatus 1108 (e.g., a database, a server, a wearable device, or another computing device). In some embodiments, the PDDF component 180 may generate communications and may transmit the generated communications to the transmission component 1106 for transmission to the apparatus 1108. In some embodiments, the transmission component 1106 may perform signal processing on the generated communications, and may transmit the processed signals to the apparatus 1108. In other embodiments, the transmission component 1106 may comprise one or more antennas, a transmit processor, a controller/processor, a memory, or a combination thereof, of the device 100 described above in reference to FIG. 1. In some embodiments, the transmission component 1106 may be co-located with the reception component 1102 such as in a transceiver and/or a transceiver component.

The PDDF component 180 may be configured to represent shapes with PDDFs. In some embodiments, the PDDF component 180 may include a set of components, such as an obtaining component 1110 configured to obtain a camera representation and a latent shape vector representation of a scene, a calculating component 1120 configured to calculate a visibility score and a depth for each ray of a plurality of rays emanating from a corresponding plurality of positions and directions, and a generating component 1130 configured to generate renders of geometric information of the scene using the visibility score and the depth of the plurality of rays.

Alternatively or additionally, the PDDF component 180 may further include a receiving component 1140 configured to receive a plurality of queries, and a correcting component 1150 configured to correct depth information of the renders of the geometric information of the scene across at least one occlusion boundary, based on a switching mechanism over a set of estimated depth values.

In some embodiments, the set of components may be separate and distinct from the PDDF component 180. In other embodiments, one or more components of the set of components may include or may be implemented within a controller/processor (e.g., the processor 120), a memory (e.g., the memory 130), or a combination thereof, of the device 100 described above in reference to FIG. 1. Alternatively or additionally, one or more components of the set of components may be implemented at least in part as software stored in a memory, such as the memory 130. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIGS. 1 and 11.

Figure 12:
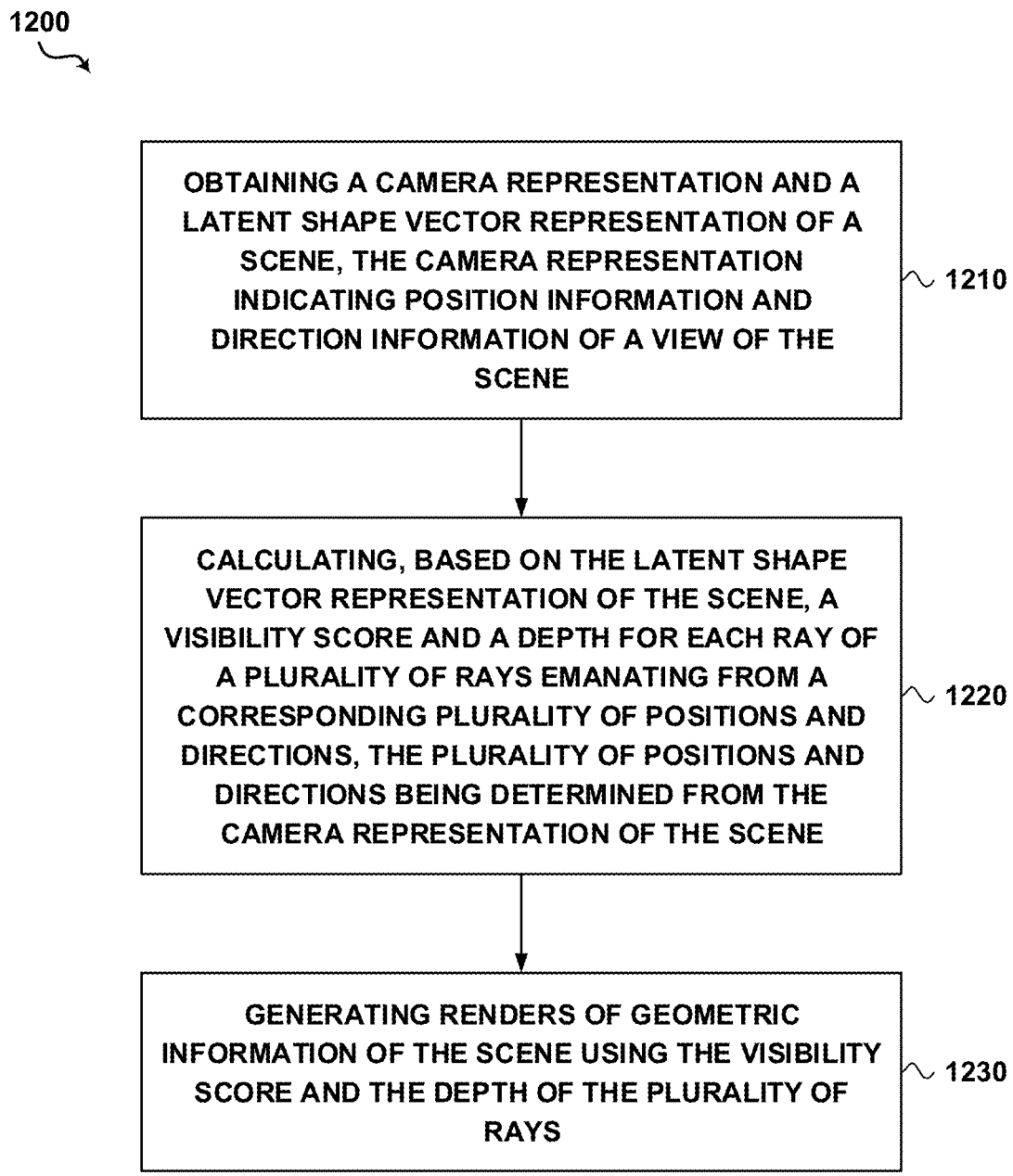
FIG. 12 depicts a flowchart of an example method of representing shapes with PDDFs to be performed by a processor, in accordance with various aspects of the present disclosure.

Referring to FIG. 12, in operation, an apparatus 1100 may perform a method 1200 of representing shapes with PDDFs. The method 1200 may be performed by the device 100 (which may include the processor 120, the memory 130, and the storage component 140, and which may be the entire device 100 and/or include one or more components of the device 100, such as the input component 150, the output component 160, the communication interface 170, and/or the PDDF component 180). The method 1200 may be performed by the device 100 and/or the PDDF component 180 in communication with the apparatus 1108 (e.g., a database, a server, a wearable device, or another computing device).

At block 1210 of FIG. 12, the method 1200 may include obtaining a camera representation and a latent shape vector representation of a scene, the camera representation indicating position information and direction information of a view of the scene. For example, in an aspect, the device 100, the PDDF component 180, and/or the obtaining component 1110 may be configured to or may comprise means for obtaining a camera representation 730 and a latent shape vector representation 750 of a scene, the camera representation 730 indicating position information and direction information 740 of a view of the scene.

For example, the obtaining at block 1210 may include encoding, using a neural encoder 720, an image 710 comprising the scene, as described in further detail in reference to FIG. 7.

Further, for example, the obtaining at block 1210 may be performed to obtain a description of the geometry of the scene that may be combined with a conditional coordinate network to calculate the visibility score and a depth values conditioned on the scene.

At block 1220 of FIG. 12, the method 1200 may include calculating, based on the latent shape vector representation of the scene, a visibility score and a depth for each ray of a plurality of rays emanating from a corresponding plurality of positions and directions, the plurality of positions and directions being determined from the camera representation of the scene. For example, in an aspect, the device 100, the PDDF component 180, and/or the calculating component 1120 may be configured to or may comprise means for calculating, based on the latent shape vector representation of the scene 750, a visibility score 770 and a depth 780 for each ray of a plurality of rays emanating from a corresponding plurality of positions and directions 740, the plurality of positions and directions 740 being determined from the camera representation of the scene 730.

For example, in the calculating at block 1220, the visibility score may indicate whether a corresponding ray intersects the scene, and the depth may indicate a distance from the corresponding position of the corresponding ray to a nearest intersection point of the corresponding ray with the scene.

In some embodiments, the calculating at block 1220 may include receiving, using the receiving component 1140, a plurality of queries requesting the visibility score and the depth for each ray of the plurality of rays emanating from the corresponding plurality of positions and directions, as further described in reference to FIG. 7. Alternatively or additionally, the calculating at block 1220 may include calculating, in response to the receiving of a query of the plurality of queries, the visibility score and the depth of a ray of the plurality of rays corresponding to the corresponding position and direction indicated by the query.

In some embodiments, the calculating at block 1220 may include performing, for each ray of the plurality of rays, a single forward pass of a conditional coordinate neural network to calculate the visibility score and the depth of that ray, as further described in reference to FIG. 7.

In other optional or additional embodiments, the calculating at block 1220 may include calculating a lowest distance for each ray of the plurality of rays intersecting the scene.

In other optional or additional embodiments, the calculating at block 1220 may include correcting depth information of the renders of the geometric information of the scene across at least one occlusion boundary, based on a switching mechanism over a set of estimated depth values.

In other optional or additional embodiments, the calculating at block 1220 may include combining a plurality of shape representations of the scene, as further described in reference to FIG. 10C and Table 1.

In other optional or additional embodiments, the calculating at block 1220 may include calculating, based on the latent shape vector representation of the scene, a reflectance value for each ray of the plurality of rays emanating from the corresponding plurality of positions and directions.

At block 1230 of FIG. 12, the method 1200 may include generating renders of geometric information of the scene using the visibility score and the depth of the plurality of rays. For example, in an aspect, the device 100, the PDDF component 180, and/or the generating component 1130 may be configured to or may comprise means for generating renders of geometric information of the scene using the visibility score and the depth of the plurality of rays.

The following aspects are illustrative only and aspects thereof may be combined with aspects of other embodiments or teaching described herein, without limitation.

Aspect 1 is a method of representing shapes with probabilistic directed distance fields to be performed by a processor. The method includes obtaining a camera representation and a latent shape vector representation of a scene. The camera representation indicates position information and direction information of a view of the scene. The method further includes calculating, based on the latent shape vector representation of the scene, a visibility score and a depth for each ray of a plurality of rays emanating from a corresponding plurality of positions and directions. The plurality of positions and directions is determined from the camera representation of the scene. The method further includes generating renders of geometric information of the scene using the visibility score and the depth of the plurality of rays.

In Aspect 2, the method of Aspect 1 may include receiving a plurality of queries requesting the visibility score and the depth for each ray of the plurality of rays emanating from the corresponding plurality of positions and directions. The calculating of the visibility score and the depth of the plurality of rays may include calculating, in response to the receiving of a query of the plurality of queries, the visibility score and the depth of a ray of the plurality of rays corresponding to the corresponding position and direction indicated by the query.

In Aspect 3, the method of any of Aspects 1 or 2 may include correcting depth information of the renders of the geometric information of the scene across at least one occlusion boundary, based on a switching mechanism over a set of estimated depth values.

In Aspect 4, the method of any of Aspects 1 to 3 may include encoding, using a neural encoder, an image comprising the scene.

In Aspect 5, the method of any of Aspects 1 to 4 may include combining a plurality of shape representations of the scene, and calculating the visibility score and the depth for each ray of the plurality of rays based on a combination of the plurality of shape representations of the scene.

In Aspect 6, the method of any of Aspects 1 to 5 may include performing, for each ray of the plurality of rays, a single forward pass of a conditional coordinate neural network to calculate the visibility score and the depth of that ray.

In Aspect 7, the method of any of Aspects 1 to 6 may include calculating a lowest distance for each ray of the plurality of rays intersecting the scene.

In Aspect 8, in the method of any of Aspects 1 to 7, the visibility score may indicate whether a corresponding ray intersects the scene, and the depth may indicate a distance from the corresponding position of the corresponding ray to a nearest intersection point of the corresponding ray with the scene.

In Aspect 9, the method of any of Aspects 1 to 8 may include calculating, based on the latent shape vector representation of the scene, a reflectance value for each ray of the plurality of rays emanating from the corresponding plurality of positions and directions.

Aspect 10 is an apparatus for representing shapes with probabilistic directed distance fields. The apparatus includes a memory storage storing computer-executable instructions, and a processor communicatively coupled to the memory storage. The processor is configured to execute the computer-executable instructions and cause the apparatus to perform one or more of the methods of any of Aspects 1 to 9.

Aspect 11 is an apparatus for representing shapes with probabilistic directed distance fields to be performed by a device including means for performing one or more of the methods of any of Aspects 1 to 9.

Aspect 12 is a non-transitory computer-readable storage medium storing computer-executable instructions for representing shapes with probabilistic directed distance fields by a device. The computer-executable instructions are configured, when executed by one or more processors of the device, to cause the device to perform one or more of the methods of any of Aspects 1 to 9.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations. Non-transitory computer-readable media may exclude transitory signals.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLAs) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

At least one of the components, elements, modules or units (collectively "components" in this paragraph) represented by a block in the drawings (e.g., FIGS. 1 and 9) may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc., that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a CPU that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

The flowchart and block diagrams in the drawings illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," "includes," "including," or the like are intended to be open-ended terms. Further, the phrase "based on" is intended to mean "based, at least in part, on" unless explicitly stated otherwise. In addition, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It is to be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

What is claimed is:

1. A method of representing shapes with probabilistic directed distance fields to be performed by a processor, comprising:
   obtaining a camera representation and a latent shape vector representation of a scene, the camera representation indicating position information and direction information of a view of the scene;
   calculating, based on the latent shape vector representation of the scene, a visibility score and a depth for each ray of a plurality of rays emanating from a corresponding plurality of positions and directions, the plurality of positions and directions being determined from the camera representation of the scene; and
   generating renders of geometric information of the scene using the visibility score and the depth of the plurality of rays.

2. The method of claim 1, further comprising:
   receiving a plurality of queries requesting the visibility score and the depth for each ray of the plurality of rays emanating from the corresponding plurality of positions and directions,
   wherein the calculating of the visibility score and the depth of the plurality of rays comprises calculating, in response to the receiving of a query of the plurality of queries, the visibility score and the depth of a ray of the plurality of rays corresponding to the corresponding position and direction indicated by the query.

3. The method of claim 1, further comprising:
   correcting depth information of the renders of the geometric information of the scene across at least one occlusion boundary, based on a switching mechanism over a set of estimated depth values.

4. The method of claim 1, wherein the obtaining of the camera representation and the latent shape vector representation of the scene comprises:
   encoding, using a neural encoder, an image comprising the scene.

5. The method of claim 1, wherein the calculating of the visibility score and the depth of the plurality of rays comprises:
   combining a plurality of shape representations of the scene; and
   calculating the visibility score and the depth for each ray of the plurality of rays based on a combination of the plurality of shape representations of the scene.

6. The method of claim 1, wherein the calculating of the visibility score and the depth of the plurality of rays comprises:
   performing, for each ray of the plurality of rays, a single forward pass of a conditional coordinate neural network to calculate the visibility score and the depth of that ray.

7. The method of claim 1, wherein the calculating of the visibility score and the depth of the plurality of rays comprises:
   calculating a lowest distance for each ray of the plurality of rays intersecting the scene.

8. The method of claim 1, wherein:
   the visibility score indicates whether a corresponding ray intersects the scene; and
   the depth indicates a distance from the corresponding position of the corresponding ray to a nearest intersection point of the corresponding ray with the scene.

9. The method of claim 1, further comprising:
   calculating, based on the latent shape vector representation of the scene, a reflectance value for each ray of the plurality of rays emanating from the corresponding plurality of positions and directions.

10. An apparatus for representing shapes with probabilistic directed distance fields, comprising:
    a memory storage storing computer-executable instructions; and
    a processor communicatively coupled to the memory storage, wherein the processor is configured to execute the computer-executable instructions and cause the apparatus to:
    obtain a camera representation and a latent shape vector representation of a scene, the camera representation indicating position information and direction information of a view of the scene;
    calculate, based on the latent shape vector representation of the scene, a visibility score and a depth for each ray of a plurality of rays emanating from a corresponding plurality of positions and directions, the plurality of positions and directions being determined from the camera representation of the scene; and
    generate renders of geometric information of the scene using the visibility score and the depth of the plurality of rays.

11. The apparatus of claim 10, wherein the processor is further configured to execute further computer-executable instructions and further cause the apparatus to:
    receive a plurality of queries requesting the visibility score and the depth for each ray of the plurality of rays emanating from the corresponding plurality of positions and directions; and
    calculate, in response to the receiving of a query of the plurality of queries, the visibility score and the depth of a ray of the plurality of rays corresponding to the corresponding position and direction indicated by the query.

12. The apparatus of claim 10, wherein the processor is further configured to execute further computer-executable instructions and further cause the apparatus to:
    correct depth information of the renders of the geometric information of the scene across at least one occlusion boundary, based on a switching mechanism over a set of estimated depth values.

13. The apparatus of claim 10, wherein the processor is further configured to execute further computer-executable instructions and further cause the apparatus to:
    encode, using a neural encoder, an image comprising the scene.

14. The apparatus of claim 10, wherein the processor is further configured to execute further computer-executable instructions and further cause the apparatus to:
    combine a plurality of shape representations of the scene; and calculate the visibility score and the depth for each ray of the plurality of rays based on a combination of the plurality of shape representations of the scene.

15. The apparatus of claim 10, wherein the processor is further configured to execute further computer-executable instructions and further cause the apparatus to:
perform, for each ray of the plurality of rays, a single forward pass of a conditional coordinate neural network to calculate the visibility score and the depth of that ray.

16. The apparatus of claim 10, wherein the processor is further configured to execute further computer-executable instructions and further cause the apparatus to:
calculate a lowest distance for each ray of the plurality of rays intersecting the scene.

17. The apparatus of claim 10, wherein:
the visibility score indicates whether a corresponding ray intersects the scene; and
the depth indicates a distance from the corresponding position of the corresponding ray to a nearest intersection point of the corresponding ray with the scene.

18. The apparatus of claim 10, wherein the processor is further configured to execute further computer-executable instructions and further cause the apparatus to:
calculate, based on the latent shape vector representation of the scene, a reflectance value for each ray of the plurality of rays emanating from the corresponding plurality of positions and directions.

19. A non-transitory computer-readable storage medium storing computer-executable instructions for representing shapes with probabilistic directed distance fields by a device, the computer-executable instructions being configured, when executed by one or more processors of the device, to cause the device to:
obtain a camera representation and a latent shape vector representation of a scene, the camera representation indicating position information and direction information of a view of the scene;
calculate, based on the latent shape vector representation of the scene, a visibility score and a depth for each ray of a plurality of rays emanating from a corresponding plurality of positions and directions, the plurality of positions and directions being determined from the camera representation of the scene; and
generate renders of geometric information of the scene using the visibility score and the depth of the plurality of rays.

20. The non-transitory computer-readable storage medium of claim 19, wherein the computer-executable instructions further cause the device to:
receive a plurality of queries requesting the visibility score and the depth for each ray of the plurality of rays emanating from the corresponding plurality of positions and directions; and
calculate, in response to the receiving of a query of the plurality of queries, the visibility score and the depth of a ray of the plurality of rays corresponding to the corresponding position and direction indicated by the query.

* * * * *